US008419546B2

(12) United States Patent
Decasa et al.

(10) Patent No.: US 8,419,546 B2
(45) Date of Patent: Apr. 16, 2013

(54) GAMING SYSTEM AND METHOD FOR SELECTIVELY PROVIDING AN ELIMINATION TOURNAMENT THAT FUNDS AN AWARD THROUGH EXPECTED VALUES OF UNPLAYED TOURNAMENT GAMES OF ELIMINATED PLAYERS

(75) Inventors: Rogelio S. Decasa, Reno, NV (US); Jason P. Pawloski, Reno, NV (US); Ryan W. Cuddy, Reno, NV (US); Karen M. Kendall, Sydney (AU); Kelsy J. Grace, Reno, NV (US); Benjamin M. Fuller, Sparks, NV (US)

(73) Assignee: IGT, Reno, NV (US)

( * ) Notice: Subject to any disclaimer, the term of this patent is extended or adjusted under 35 U.S.C. 154(b) by 421 days.

(21) Appl. No.: 12/871,359

(22) Filed: Aug. 30, 2010

(65) Prior Publication Data

US 2011/0077071 A1 Mar. 31, 2011

Related U.S. Application Data

(60) Provisional application No. 61/238,458, filed on Aug. 31, 2009.

(51) Int. Cl.
*A63F 13/00* (2006.01)

(52) U.S. Cl.
USPC ........................................................ 463/42

(58) Field of Classification Search ..................... 463/42
See application file for complete search history.

(56) References Cited

U.S. PATENT DOCUMENTS

| | | | |
|---|---|---|---|
| 4,339,798 | A | 7/1982 | Hedges et al. |
| 4,582,324 | A | 4/1986 | Koza et al. |
| 4,624,459 | A | 11/1986 | Kaufman |
| 4,669,731 | A | 6/1987 | Clarke |
| 4,679,143 | A | 7/1987 | Hagiwara |
| 4,695,053 | A | 9/1987 | Vazquez, Jr. et al. |
| 4,817,951 | A | 4/1989 | Couch et al. |
| 4,837,728 | A | 6/1989 | Barrie et al. |

(Continued)

FOREIGN PATENT DOCUMENTS

| | | |
|---|---|---|
| AU | 42326/89 | 3/1990 |
| CA | 2527367 | 5/2007 |

(Continued)

OTHER PUBLICATIONS

Diamond Dash Advertisement [online] [retrieved on Mar. 31, 2004]. Retrieved from the Internet at <URL: http://www.arcadeplanet.com/images/diamond_dash.jpg>. (1 page).

(Continued)

*Primary Examiner* — Arthur O. Hall
*Assistant Examiner* — Jeffrey Wong
(74) *Attorney, Agent, or Firm* — Neal, Gerber & Eisenberg LLP

(57) ABSTRACT

A gaming system including a central server operable to communicate a plurality of different commands to a plurality of gaming devices to provide non-tournament game play and provide an elimination tournament. The gaming system contributes an average expected payout value of tournament games that were determined to be subsequently played by tournament players but were then not played because the players were eliminated before the end of the tournament to a tournament award. The tournament award is provided to a winner of the tournament.

16 Claims, 24 Drawing Sheets

U.S. PATENT DOCUMENTS 4,856,787 A 8/1989 Itkis
4,871,171 A 10/1989 Rivero
4,991,848 A 2/1991 Greenwood et al.
5,042,809 A 8/1991 Richardson
5,046,735 A 9/1991 Hamano et al.
5,083,271 A 1/1992 Thacher et al.
5,114,155 A 5/1992 Tillery et al.
5,152,529 A 10/1992 Okada
5,186,460 A 2/1993 Fongeallaz et al.
5,205,555 A 4/1993 Hamano
5,242,163 A 9/1993 Fulton
5,259,613 A 11/1993 Marnell, II
5,265,874 A 11/1993 Dickinson et al.
5,275,400 A 1/1994 Weingardt et al.
5,288,081 A 2/1994 Breeding
5,290,033 A 3/1994 Bittner et al.
5,342,049 A 8/1994 Wichinsky
5,359,510 A 10/1994 Sabaliauskas
5,393,057 A 2/1995 Marnell, II
5,393,061 A 2/1995 Manship et al.
5,395,111 A 3/1995 Inoue
5,397,125 A 3/1995 Adams
5,407,200 A 4/1995 Zalabak
5,417,430 A 5/1995 Breeding
5,423,539 A 6/1995 Nagao
5,449,173 A 9/1995 Thomas et al.
5,456,465 A 10/1995 Durham
5,472,197 A 12/1995 Gwiasda et al.
5,544,892 A 8/1996 Breeding
5,560,603 A 10/1996 Seelig et al.
5,564,701 A 10/1996 Dettor
5,580,309 A 12/1996 Piechowiak et al.
5,611,535 A 3/1997 Tiberio
5,611,730 A 3/1997 Weiss
5,645,486 A 7/1997 Nagao et al.
5,647,798 A 7/1997 Falciglia
5,655,961 A 8/1997 Acres et al.
5,664,998 A 9/1997 Seelig et al.
5,702,304 A 12/1997 Acres et al.
5,711,525 A 1/1998 Breeding
5,711,715 A 1/1998 Ringo et al.
5,722,891 A 3/1998 Inoue
5,741,183 A 4/1998 Acres et al.
5,746,656 A 5/1998 Bezick et al.
5,752,882 A 5/1998 Acres et al.
5,755,621 A 5/1998 Marks et al.
5,758,875 A 6/1998 Giacalone, Jr.
5,761,647 A 6/1998 Boushy
5,769,716 A 6/1998 Saffari et al.
5,772,506 A 6/1998 Marks et al.
5,775,692 A 7/1998 Watts et al.
5,779,242 A 7/1998 Kaufmann
5,779,544 A 7/1998 Seelig et al.
5,779,549 A 7/1998 Walker et al.
5,788,573 A 8/1998 Baerlocher et al.
5,806,045 A 9/1998 Biorge et al.
5,807,172 A 9/1998 Piechowiak
5,816,918 A 10/1998 Kelly et al.
5,820,459 A 10/1998 Acres et al.
5,820,460 A 10/1998 Fulton
5,823,873 A 10/1998 Moody
5,823,874 A 10/1998 Adams
5,823,879 A 10/1998 Goldberg et al.
5,833,536 A 11/1998 Davids et al.
5,833,537 A 11/1998 Barrie
5,836,817 A 11/1998 Acres et al.
5,848,932 A 12/1998 Adams
5,851,148 A 12/1998 Brune et al.
404,436 A 1/1999 McGahn et al.
5,855,514 A 1/1999 Kamille
5,855,515 A 1/1999 Pease et al.
5,855,516 A 1/1999 Eiba
5,876,284 A 3/1999 Acres et al.
5,882,260 A 3/1999 Marks et al.
5,882,261 A 3/1999 Adams
5,898,587 A 4/1999 Bell et al.
5,902,184 A 5/1999 Bennett
5,902,983 A 5/1999 Crevelt et al.
5,911,418 A 6/1999 Adams
5,917,725 A 6/1999 Thacher et al.
5,918,880 A 7/1999 Voigt, IV et al.
5,919,088 A 7/1999 Weiss
5,924,927 A 7/1999 Matsuura et al.
5,935,000 A 8/1999 Sanchez, III et al.
5,935,002 A 8/1999 Falciglia
5,941,772 A 8/1999 Paige
5,947,820 A 9/1999 Morro et al.
5,951,397 A 9/1999 Dickinson
5,964,463 A 10/1999 Moore, Jr.
5,971,849 A 10/1999 Falciglia
5,976,015 A 11/1999 Seelig et al.
5,980,384 A 11/1999 Barrie
5,984,781 A 11/1999 Sunaga
5,984,782 A 11/1999 Inoue
5,988,638 A 11/1999 Rodesch et al.
5,993,316 A 11/1999 Coyle et al.
5,997,400 A 12/1999 Seelig et al.
5,997,401 A 12/1999 Crawford
6,003,867 A 12/1999 Rodesch et al.
6,004,207 A 12/1999 Wilson, Jr. et al.
6,012,982 A 1/2000 Piechowiak et al.
6,012,983 A 1/2000 Walker et al.
6,015,346 A 1/2000 Bennett
6,019,374 A 2/2000 Breeding
6,039,648 A 3/2000 Guinn et al.
6,048,271 A 4/2000 Barcelou
6,056,642 A 5/2000 Bennett
6,059,289 A 5/2000 Vancura
6,059,658 A 5/2000 Mangano et al.
6,062,980 A 5/2000 Luciano
6,077,162 A 6/2000 Weiss
6,082,887 A 7/2000 Feuer et al.
6,089,975 A 7/2000 Dunn
6,089,976 A 7/2000 Schneider et al.
6,089,977 A 7/2000 Bennett
6,089,978 A 7/2000 Adams
6,093,100 A 7/2000 Singer et al.
6,102,400 A 8/2000 Scott et al.
6,102,798 A 8/2000 Bennett
6,110,043 A 8/2000 Olsen
6,113,098 A 9/2000 Adams
6,120,378 A 9/2000 Moody et al.
6,126,541 A 10/2000 Fuchs
6,126,542 A 10/2000 Fier
6,128,550 A 10/2000 Heidel et al.
6,135,885 A 10/2000 Lermusiaux
6,142,872 A 11/2000 Walker et al.
6,142,873 A 11/2000 Weiss et al.
6,142,874 A 11/2000 Kodachi et al.
6,142,875 A 11/2000 Kodachi et al.
6,146,273 A 11/2000 Olsen
6,155,925 A 12/2000 Giobbi et al.
6,159,095 A 12/2000 Frohm et al.
6,159,097 A 12/2000 Gura
6,159,098 A 12/2000 Slomiany et al.
6,162,121 A 12/2000 Morro et al.
6,162,122 A 12/2000 Acres et al.
6,165,071 A 12/2000 Weiss
6,165,072 A 12/2000 Davis et al.
6,168,520 B1 1/2001 Baerlocher et al.
6,168,521 B1 1/2001 Luciano et al.
6,168,523 B1 1/2001 Piechowiak et al.
6,173,955 B1 1/2001 Perrie et al.
6,174,233 B1 1/2001 Sunaga et al.
6,174,237 B1 1/2001 Stephenson
6,186,893 B1 2/2001 Walker et al.
6,186,894 B1 2/2001 Mayeroff
6,190,254 B1 2/2001 Bennett
6,190,255 B1 2/2001 Thomas et al.
6,193,606 B1 2/2001 Walker et al.
6,203,010 B1 3/2001 Jorasch et al.
6,203,428 B1 3/2001 Giobbi et al.
6,203,429 B1 3/2001 Demar et al.
6,206,782 B1 3/2001 Walker et al.
6,210,275 B1 4/2001 Olsen
6,210,277 B1 4/2001 Stefan
6,217,448 B1 4/2001 Olsen

| | | | |
|---|---|---|---|
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,227,971 | B1 | 5/2001 | Weiss |
| 6,231,442 | B1 | 5/2001 | Mayeroff |
| 6,231,445 | B1 | 5/2001 | Acres |
| 6,234,879 | B1 | 5/2001 | Hasegawa et al. |
| 6,234,897 | B1 | 5/2001 | Frohm et al. |
| 6,238,287 | B1 | 5/2001 | Komori et al. |
| 6,244,958 | B1 | 6/2001 | Acres |
| 6,251,013 | B1 | 6/2001 | Bennett |
| 6,257,981 | B1 | 7/2001 | Acres et al. |
| 6,261,128 | B1 | 7/2001 | Heim et al. |
| 6,261,177 | B1 | 7/2001 | Bennett |
| 6,270,409 | B1 | 8/2001 | Shuster |
| 6,270,411 | B1 | 8/2001 | Gura et al. |
| 6,270,412 | B1 | 8/2001 | Crawford et al. |
| 6,287,202 | B1 | 9/2001 | Pascal et al. |
| 6,299,165 | B1 | 10/2001 | Nagano |
| 6,302,790 | B1 | 10/2001 | Brossard |
| 6,305,686 | B1 | 10/2001 | Perrie et al. |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,332 | B1 | 11/2001 | Walker et al. |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,315,668 | B1 | 11/2001 | Metke et al. |
| 6,319,122 | B1 | 11/2001 | Packes, Jr. et al. |
| 6,319,127 | B1 | 11/2001 | Walker et al. |
| 6,322,451 | B1 | 11/2001 | Miura |
| 6,328,649 | B1 | 12/2001 | Randall et al. |
| 6,334,614 | B1 | 1/2002 | Breeding |
| 6,334,864 | B1 | 1/2002 | Amplatz et al. |
| 6,340,158 | B2 | 1/2002 | Pierce et al. |
| 6,347,996 | B1 | 2/2002 | Gilmore et al. |
| 6,352,479 | B1 | 3/2002 | Sparks, II |
| 6,354,592 | B1 | 3/2002 | Virzi |
| 6,361,441 | B1 | 3/2002 | Walker et al. |
| 6,364,765 | B1 | 4/2002 | Walker et al. |
| 6,364,766 | B1 | 4/2002 | Anderson et al. |
| 6,364,768 | B1 | 4/2002 | Acres et al. |
| 6,375,567 | B1 | 4/2002 | Acres |
| 6,390,299 | B1 | 5/2002 | Mellon et al. |
| 6,394,902 | B1 | 5/2002 | Glavich et al. |
| 6,398,644 | B1 | 6/2002 | Perrie et al. |
| 6,406,371 | B1 | 6/2002 | Baba et al. |
| 6,409,602 | B1 | 6/2002 | Wiltshire et al. |
| 6,413,161 | B1 | 7/2002 | Baerlocher et al. |
| 6,416,408 | B2 | 7/2002 | Tracy et al. |
| 6,419,583 | B1 | 7/2002 | Crumby et al. |
| 6,425,828 | B2 | 7/2002 | Walker et al. |
| 6,431,983 | B2 | 8/2002 | Acres |
| 6,439,993 | B1 | 8/2002 | O'Halloran |
| 6,443,452 | B1 | 9/2002 | Brune |
| RE37,885 | E | 10/2002 | Acres et al. |
| 6,468,155 | B1 | 10/2002 | Zucker et al. |
| 6,471,208 | B2 | 10/2002 | Yoseloff et al. |
| 6,471,591 | B1 | 10/2002 | Crumby |
| 6,481,713 | B2 | 11/2002 | Perrie et al. |
| 6,491,584 | B2 | 12/2002 | Graham |
| 6,503,145 | B1 | 1/2003 | Webb |
| 6,508,709 | B1 | 1/2003 | Karmarkar |
| 6,514,139 | B2 | 2/2003 | Levitan |
| 6,517,432 | B1 | 2/2003 | Jaffe |
| 6,533,664 | B1 | 3/2003 | Crumby |
| 6,537,150 | B1 | 3/2003 | Luciano et al. |
| 6,537,152 | B2 | 3/2003 | Seelig et al. |
| 6,543,774 | B1 | 4/2003 | Taylor |
| 6,551,187 | B1 | 4/2003 | Jaffe |
| 6,561,904 | B2 | 5/2003 | Locke et al. |
| 6,565,436 | B1 | 5/2003 | Baerlocher |
| 6,572,471 | B1 | 6/2003 | Bennett |
| 6,575,830 | B2 | 6/2003 | Baerlocher et al. |
| 6,585,591 | B1 | 7/2003 | Baerlocher et al. |
| 6,585,592 | B1 | 7/2003 | Crumby |
| 6,599,185 | B1 | 7/2003 | Kaminkow et al. |
| 6,599,192 | B1 | 7/2003 | Baerlocher |
| 6,602,136 | B1 | 8/2003 | Baerlocher et al. |
| 6,604,740 | B1 | 8/2003 | Singer et al. |
| 6,604,997 | B2 | 8/2003 | Saidakovsky et al. |
| 6,607,195 | B2 | 8/2003 | Vancura |
| 6,607,438 | B2 | 8/2003 | Baerlocher et al. |
| 6,625,578 | B2 | 9/2003 | Spaur et al. |
| 6,632,140 | B2 | 10/2003 | Berman et al. |
| 6,634,943 | B1 | 10/2003 | Baerlocher |
| 6,638,170 | B1 | 10/2003 | Crumby |
| 6,648,753 | B1 | 11/2003 | Tracy et al. |
| 6,652,378 | B2 | 11/2003 | Cannon et al. |
| 6,656,047 | B1 | 12/2003 | Tarantino et al. |
| 6,663,489 | B2 | 12/2003 | Baerlocher |
| 6,688,973 | B2 | 2/2004 | Satloff et al. |
| 6,699,124 | B2 | 3/2004 | Suchocki |
| 6,705,944 | B2 | 3/2004 | Luciano |
| 6,712,699 | B2 | 3/2004 | Walker et al. |
| 6,712,702 | B2 | 3/2004 | Goldberg et al. |
| 6,726,565 | B2 | 4/2004 | Hughs-Baird |
| 6,729,959 | B1 | 5/2004 | Moore et al. |
| 6,733,386 | B2 | 5/2004 | Cuddy et al. |
| 6,733,389 | B2 | 5/2004 | Webb et al. |
| 6,733,390 | B2 | 5/2004 | Walker et al. |
| 6,755,743 | B1 | 6/2004 | Yamashita et al. |
| 6,758,750 | B2 | 7/2004 | Baerlocher et al. |
| 6,775,580 | B2 | 8/2004 | Jira et al. |
| 6,776,711 | B1 | 8/2004 | Baerlocher |
| 6,780,105 | B1 | 8/2004 | Kaminkow |
| 6,786,824 | B2 | 9/2004 | Cannon |
| 6,790,143 | B2 | 9/2004 | Crumby |
| 6,800,030 | B2 | 10/2004 | Acres |
| 6,802,775 | B2 | 10/2004 | Baerlocher et al. |
| 6,805,629 | B1 | 10/2004 | Weiss |
| 6,811,483 | B1 | 11/2004 | Webb et al. |
| 6,814,664 | B2 | 11/2004 | Baerlocher et al. |
| 6,817,948 | B2 | 11/2004 | Pascal et al. |
| 6,832,958 | B2 | 12/2004 | Acres et al. |
| 6,837,793 | B2 | 1/2005 | McClintic |
| 6,843,724 | B2 | 1/2005 | Walker et al. |
| 6,843,725 | B2 | 1/2005 | Nelson |
| 6,848,997 | B1 | 2/2005 | Hashimoto et al. |
| 6,852,030 | B2 | 2/2005 | Baerlocher et al. |
| 6,855,052 | B2 | 2/2005 | Weiss et al. |
| 6,860,808 | B2 | 3/2005 | Levitan |
| 6,860,810 | B2 | 3/2005 | Cannon et al. |
| 6,863,612 | B2 | 3/2005 | Willis |
| 6,869,360 | B2 | 3/2005 | Marks et al. |
| 6,869,361 | B2 | 3/2005 | Sharpless et al. |
| 6,875,110 | B1 | 4/2005 | Crumby |
| 6,884,167 | B2 | 4/2005 | Walker et al. |
| 6,887,151 | B2 | 5/2005 | Leen et al. |
| 6,887,159 | B2 | 5/2005 | Leen et al. |
| 6,890,257 | B2 | 5/2005 | Baerlocher |
| 6,890,258 | B2 | 5/2005 | Weiss |
| 6,896,616 | B2 | 5/2005 | Weiss |
| 6,899,620 | B2 | 5/2005 | Kaminkow et al. |
| 6,899,628 | B2 | 5/2005 | Leen et al. |
| 6,908,383 | B2 | 6/2005 | Baerlocher et al. |
| 6,908,390 | B2 | 6/2005 | Nguyen et al. |
| 6,910,962 | B2 | 6/2005 | Marks et al. |
| 6,913,532 | B2 | 7/2005 | Baerlocher et al. |
| 6,913,533 | B2 | 7/2005 | Cuddy et al. |
| 6,929,546 | B2 | 8/2005 | Moore et al. |
| 6,929,550 | B2 | 8/2005 | Hisada |
| 6,932,708 | B2 | 8/2005 | Yamashita et al. |
| 6,935,958 | B2 | 8/2005 | Nelson |
| 6,939,224 | B2 | 9/2005 | Palmer et al. |
| 6,939,229 | B2 | 9/2005 | McClintic |
| RE38,812 | E | 10/2005 | Acres et al. |
| 6,955,600 | B2 | 10/2005 | Glavich et al. |
| 6,960,134 | B2 | 11/2005 | Hartl et al. |
| 6,964,608 | B1 | 11/2005 | Koza |
| 6,966,832 | B2 | 11/2005 | Leen et al. |
| 6,971,955 | B2 | 12/2005 | Baerlocher et al. |
| 6,979,263 | B2 | 12/2005 | Baerlocher et al. |
| 6,979,267 | B2 | 12/2005 | Leen et al. |
| 6,984,177 | B2 | 1/2006 | Lydon et al. |

| | | | |
|---|---|---|---|
| 6,986,710 | B2 | 1/2006 | Baerlocher |
| 6,991,538 | B2 | 1/2006 | Cannon |
| 6,997,804 | B2 | 2/2006 | Berman |
| 7,004,835 | B2 | 2/2006 | Baerlocher |
| 7,014,563 | B2 | 3/2006 | Stephan et al. |
| 7,029,395 | B1 | 4/2006 | Baerlocher |
| 7,052,395 | B2 | 5/2006 | Glavich et al. |
| 7,056,213 | B2 | 6/2006 | Ching et al. |
| 7,066,814 | B2 | 6/2006 | Glavich et al. |
| 7,074,127 | B2 | 7/2006 | Cuddy et al. |
| 7,090,580 | B2 | 8/2006 | Rodgers et al. |
| 7,094,148 | B2 | 8/2006 | Baerlocher et al. |
| 7,104,886 | B2 | 9/2006 | Baerlocher et al. |
| 7,105,736 | B2 | 9/2006 | Laakso |
| 7,121,942 | B2 | 10/2006 | Baerlocher |
| 7,147,559 | B2 | 12/2006 | Englman |
| 7,153,205 | B2 | 12/2006 | Baerlocher |
| 7,160,186 | B2 | 1/2007 | Cuddy et al. |
| 7,169,042 | B2 | 1/2007 | Muir et al. |
| 7,192,352 | B2 | 3/2007 | Walker et al. |
| 7,198,570 | B2 | 4/2007 | Rodgers et al. |
| 7,235,011 | B2 | 6/2007 | Randall et al. |
| 7,238,110 | B2 | 7/2007 | Glavich et al. |
| 7,252,590 | B2 | 8/2007 | Palmer et al. |
| 7,258,611 | B2 | 8/2007 | Bigelow, Jr. et al. |
| 7,300,348 | B2 | 11/2007 | Kaminkow et al. |
| 7,300,351 | B2 | 11/2007 | Thomas |
| 7,303,475 | B2 | 12/2007 | Britt et al. |
| 7,322,887 | B2 | 1/2008 | Belger et al. |
| 7,326,109 | B2 | 2/2008 | Baerlocher |
| 7,326,115 | B2 | 2/2008 | Baerlocher |
| 7,329,179 | B2 | 2/2008 | Baerlocher |
| 7,331,862 | B2 | 2/2008 | Rodgers et al. |
| 7,331,866 | B2 | 2/2008 | Rodgers et al. |
| 7,331,867 | B2 | 2/2008 | Baerlocher et al. |
| 7,341,513 | B2 | 3/2008 | Cuddy et al. |
| 7,351,146 | B2 | 4/2008 | Kaminkow |
| 7,357,713 | B2 | 4/2008 | Marks et al. |
| 7,357,716 | B2 | 4/2008 | Marks et al. |
| 7,364,510 | B2 | 4/2008 | Walker et al. |
| 7,371,169 | B2 | 5/2008 | Baerlocher |
| 7,371,170 | B2 | 5/2008 | Cregan et al. |
| 7,374,486 | B2 | 5/2008 | Baerlocher |
| 7,381,134 | B2 | 6/2008 | Cuddy et al. |
| 7,384,334 | B2 | 6/2008 | Glavich et al. |
| 7,387,571 | B2 | 6/2008 | Walker et al. |
| 7,399,228 | B2 | 7/2008 | Baerlocher |
| 7,402,103 | B2 | 7/2008 | Baerlocher |
| 7,458,894 | B2 | 12/2008 | Danieli et al. |
| 7,465,227 | B2 | 12/2008 | Baerlocher |
| 7,470,181 | B2 | 12/2008 | Gauselmann |
| 7,470,185 | B2 | 12/2008 | Baerlocher |
| 7,470,187 | B2 | 12/2008 | Baerlocher et al. |
| 7,470,188 | B2 | 12/2008 | Baerlocher et al. |
| 7,470,189 | B2 | 12/2008 | Baerlocher et al. |
| 7,470,190 | B2 | 12/2008 | Baerlocher et al. |
| 7,473,174 | B2 | 1/2009 | Cuddy et al. |
| 7,481,708 | B2 | 1/2009 | Baerlocher et al. |
| 7,485,043 | B2 | 2/2009 | Beaulieu et al. |
| 7,488,251 | B2 | 2/2009 | Kaminkow |
| 7,503,848 | B2 | 3/2009 | Berman et al. |
| 7,507,156 | B2 | 3/2009 | Nicely |
| 7,578,737 | B2 | 8/2009 | Cregan et al. |
| 7,578,738 | B2 | 8/2009 | Cregan et al. |
| 7,674,168 | B2 | 3/2010 | Gerrard et al. |
| 7,690,986 | B2 | 4/2010 | Ching et al. |
| 7,749,063 | B2 | 7/2010 | Belger et al. |
| 7,749,070 | B2 | 7/2010 | Baerlocher et al. |
| 7,775,874 | B2 | 8/2010 | Ching et al. |
| 7,833,095 | B2 | 11/2010 | Cuddy et al. |
| 7,850,521 | B2 | 12/2010 | Rodgers et al. |
| 7,857,695 | B2 | 12/2010 | Rodgers et al. |
| 8,317,620 | B2 * | 11/2012 | Kelly et al. .................... 463/42 |
| 2001/0009865 | A1 | 7/2001 | Demar et al. |
| 2002/0010017 | A1 | 1/2002 | Bennett |
| 2002/0028707 | A1 | 3/2002 | Pascal et al. |
| 2002/0039923 | A1 | 4/2002 | Cannon et al. |
| 2002/0052233 | A1 | 5/2002 | Gauselmann |
| 2002/0151342 | A1 | 10/2002 | Tracy et al. |
| 2002/0160825 | A1 | 10/2002 | Nicastro et al. |
| 2002/0177483 | A1 | 11/2002 | Cannon |
| 2003/0022712 | A1 | 1/2003 | Locke |
| 2003/0050111 | A1 | 3/2003 | Saffari |
| 2003/0060264 | A1 | 3/2003 | Chilton et al. |
| 2003/0060272 | A1 | 3/2003 | Glavich et al. |
| 2003/0114218 | A1 | 6/2003 | McClintic |
| 2003/0130041 | A1 | 7/2003 | Pascal et al. |
| 2003/0144053 | A1 | 7/2003 | Michaelson |
| 2003/0176219 | A1 | 9/2003 | Manfredi et al. |
| 2003/0186745 | A1 | 10/2003 | Nguyen et al. |
| 2003/0190960 | A1 | 10/2003 | Jokipii et al. |
| 2003/0199321 | A1 | 10/2003 | Williams |
| 2004/0029631 | A1 | 2/2004 | Duhamel |
| 2004/0048649 | A1 | 3/2004 | Peterson et al. |
| 2004/0053665 | A1 | 3/2004 | Baerlocher |
| 2004/0053666 | A1 | 3/2004 | Vancura |
| 2004/0053669 | A1 | 3/2004 | Gerrard et al. |
| 2004/0063492 | A1 | 4/2004 | Baerlocher et al. |
| 2004/0063493 | A1 | 4/2004 | Baerlocher |
| 2004/0132521 | A1 | 7/2004 | Peterson |
| 2004/0142750 | A1 | 7/2004 | Glisson et al. |
| 2004/0152500 | A1 | 8/2004 | Baerlocher |
| 2004/0176157 | A1 | 9/2004 | Walker et al. |
| 2004/0176167 | A1 | 9/2004 | Michaelson et al. |
| 2004/0204218 | A1 | 10/2004 | Hughs-Baird |
| 2004/0204226 | A1 | 10/2004 | Foster et al. |
| 2004/0204243 | A1 | 10/2004 | de Mello Costa |
| 2004/0224773 | A1 | 11/2004 | Sham |
| 2004/0229700 | A1 | 11/2004 | Cannon et al. |
| 2004/0242302 | A1 | 12/2004 | Baerlocher |
| 2004/0242325 | A1 | 12/2004 | Levitan et al. |
| 2004/0248652 | A1 | 12/2004 | Massey et al. |
| 2004/0266512 | A1 | 12/2004 | Kaminkow |
| 2004/0266517 | A1 | 12/2004 | Bleich et al. |
| 2005/0005127 | A1 | 1/2005 | Rowe et al. |
| 2005/0020346 | A1 | 1/2005 | Baerlocher |
| 2005/0020352 | A1 | 1/2005 | Chilton et al. |
| 2005/0043072 | A1 | 2/2005 | Nelson |
| 2005/0043088 | A1 | 2/2005 | Nguyen et al. |
| 2005/0043089 | A1 | 2/2005 | Nguyen et al. |
| 2005/0043094 | A1 | 2/2005 | Nguyen et al. |
| 2005/0049035 | A1 | 3/2005 | Baerlocher et al. |
| 2005/0054429 | A1 | 3/2005 | Baerlocher et al. |
| 2005/0054431 | A1 | 3/2005 | Walker et al. |
| 2005/0059446 | A1 | 3/2005 | Kaminkow |
| 2005/0060050 | A1 | 3/2005 | Baerlocher |
| 2005/0071023 | A1 | 3/2005 | Gilliland et al. |
| 2005/0071024 | A1 | 3/2005 | Henshaw |
| 2005/0075163 | A1 | 4/2005 | Cuddy et al. |
| 2005/0102047 | A1 | 5/2005 | Ottofy |
| 2005/0119043 | A1 | 6/2005 | Berman et al. |
| 2005/0130729 | A1 | 6/2005 | Baerlocher et al. |
| 2005/0148380 | A1 | 7/2005 | Cannon et al. |
| 2005/0153760 | A1 | 7/2005 | Varley |
| 2005/0153767 | A1 | 7/2005 | Gauselmann |
| 2005/0170892 | A1 | 8/2005 | Atkinson |
| 2005/0181856 | A1 | 8/2005 | Cannon et al. |
| 2005/0192081 | A1 | 9/2005 | Marks et al. |
| 2005/0192089 | A1 | 9/2005 | Blatter et al. |
| 2005/0197180 | A1 | 9/2005 | Kaminkow et al. |
| 2005/0208989 | A1 | 9/2005 | Kane et al. |
| 2005/0215310 | A1 | 9/2005 | Boyd et al. |
| 2005/0221882 | A1 | 10/2005 | Nguyen et al. |
| 2005/0233794 | A1 | 10/2005 | Cannon et al. |
| 2005/0233796 | A1 | 10/2005 | Baerlocher et al. |
| 2005/0236068 | A1 | 10/2005 | Jansheski |
| 2005/0255919 | A1 | 11/2005 | Nelson |
| 2005/0267610 | A1 | 12/2005 | Shinoda |
| 2005/0278041 | A1 | 12/2005 | Bortnik et al. |
| 2005/0288101 | A1 | 12/2005 | Lockton et al. |
| 2005/0288803 | A1 | 12/2005 | Ropp et al. |
| 2006/0003827 | A1 | 1/2006 | Hartl et al. |
| 2006/0003835 | A1 | 1/2006 | Olive |
| 2006/0009277 | A1 | 1/2006 | Hartl et al. |
| 2006/0019734 | A1 | 1/2006 | Roemer |
| 2006/0019744 | A1 | 1/2006 | Roemer |
| 2006/0030407 | A1 | 2/2006 | Thayer |
| 2006/0030959 | A1 | 2/2006 | Duhamel |

2006/0030960 A1 2/2006 Duhamel et al.
2006/0040735 A1 2/2006 Baerlocher
2006/0055113 A1 3/2006 Levi
2006/0058103 A1 3/2006 Danieli et al.
2006/0063580 A1 3/2006 Nguyen et al.
2006/0063582 A1 3/2006 Baerlocher et al.
2006/0063585 A1 3/2006 Cuddy
2006/0068884 A1 3/2006 Baerlocher et al.
2006/0068885 A1 3/2006 Cregan et al.
2006/0073876 A1 4/2006 Cuddy
2006/0082056 A1 4/2006 Kane et al.
2006/0084494 A1 4/2006 Belger et al.
2006/0089189 A1 4/2006 Harvey
2006/0105839 A1 5/2006 Graeve et al.
2006/0128453 A1 6/2006 Hoffman
2006/0128457 A1 6/2006 Cannon
2006/0128472 A1 6/2006 Beavers
2006/0135253 A1 6/2006 George et al.
2006/0136079 A1 6/2006 Stern
2006/0138728 A1 6/2006 Gordon et al.
2006/0148565 A1 7/2006 Gauselmann et al.
2006/0157934 A1 7/2006 Yoseloff et al.
2006/0160600 A1 7/2006 Hill et al.
2006/0160608 A1 7/2006 Hill et al.
2006/0161276 A1 7/2006 Soltani
2006/0165254 A1 7/2006 Fujimoto et al.
2006/0177109 A1 8/2006 Storch
2006/0178185 A1 8/2006 Weis
2006/0178202 A1 8/2006 Hughes et al.
2006/0183540 A1 8/2006 Grauzer et al.
2006/0199636 A1 9/2006 Ching et al.
2006/0199637 A1 9/2006 Ching et al.
2006/0202422 A1 9/2006 Bahar
2006/0214372 A1 9/2006 Picken
2006/0223638 A1 10/2006 Koyama et al.
2006/0226605 A1 10/2006 Kenny
2006/0229122 A1 10/2006 Macke
2006/0232012 A1 10/2006 Boyer
2006/0241795 A1 10/2006 Weingardt et al.
2006/0246989 A1 11/2006 Glavich et al.
2006/0247012 A1 11/2006 Walker et al.
2006/0247955 A1 11/2006 Humphrey
2006/0252521 A1 11/2006 Gururajan et al.
2006/0252554 A1 11/2006 Gururajan et al.
2006/0258427 A1 11/2006 Rowe et al.
2006/0258442 A1 11/2006 Ryan
2006/0293099 A1 12/2006 Cooper
2007/0010316 A1 1/2007 Baerlocher et al.
2007/0015587 A1 1/2007 Glisson et al.
2007/0021188 A1 1/2007 Rodgers et al.
2007/0049372 A1 3/2007 Olivas et al.
2007/0054726 A1 3/2007 Muir et al.
2007/0060294 A1 3/2007 Cuddy et al.
2007/0087809 A1 4/2007 Baerlocher
2007/0087823 A1 4/2007 Walker et al.
2007/0090599 A1 4/2007 Hamilton
2007/0117621 A1 5/2007 Walker et al.
2007/0129147 A1 6/2007 Gagner
2007/0135950 A1 6/2007 Oliveras
2007/0135951 A1 6/2007 Romik et al.
2007/0167239 A1 7/2007 O'Rourke
2007/0173318 A1 7/2007 Abbott
2007/0218968 A1 9/2007 Snow et al.
2007/0243936 A1 10/2007 Binenstock et al.
2007/0259709 A1 11/2007 Kelly et al.
2007/0270204 A1 11/2007 Palmer et al.
2007/0281778 A1 12/2007 Bigelow, Jr. et al.
2007/0287521 A1 12/2007 Glavich et al.
2007/0293293 A1 12/2007 Baerlocher et al.
2007/0298857 A1 12/2007 Schlottmann et al.
2008/0045344 A1 2/2008 Schlottmann et al.
2008/0064502 A1 3/2008 Schlottmann et al.
2008/0076496 A1 3/2008 Baerlocher et al.
2008/0076531 A1 3/2008 Baerlocher et al.
2008/0076532 A1 3/2008 Graham et al.
2008/0076534 A1 3/2008 Iddings et al.
2008/0076542 A1 3/2008 Iddings et al.
2008/0076576 A1 3/2008 Graham et al.
2008/0085771 A1 4/2008 Iddings et al.
2008/0085772 A1 4/2008 Iddings et al.
2008/0090655 A1 4/2008 Marks et al.
2008/0102931 A1 5/2008 Marks et al.
2008/0102934 A1 5/2008 Tan
2008/0108404 A1 5/2008 Iddings et al.
2008/0108406 A1 5/2008 Oberberger
2008/0108425 A1 5/2008 Oberberger
2008/0108429 A1 5/2008 Davis et al.
2008/0113759 A1 5/2008 Baerlocher
2008/0113760 A1 5/2008 Baerlocher
2008/0113761 A1 5/2008 Belger et al.
2008/0113765 A1 5/2008 DeWaal
2008/0113779 A1 5/2008 Cregan
2008/0132320 A1 6/2008 Rodgers
2008/0139296 A1 6/2008 Baerlocher et al.
2008/0139298 A1 6/2008 Rodgers et al.
2008/0153584 A1 6/2008 Cuddy et al.
2008/0182650 A1 7/2008 Randall et al.
2008/0182655 A1 7/2008 DeWaal et al.
2008/0194316 A1 8/2008 Baerlocher
2008/0200232 A1 8/2008 Baerlocher et al.
2008/0200237 A1 8/2008 Cuddy et al.
2008/0207298 A1 8/2008 Marks et al.
2008/0214280 A1 9/2008 Baerlocher
2008/0220851 A1 9/2008 Glavich et al.
2008/0293481 A1 11/2008 Davies
2008/0318668 A1 12/2008 Ching et al.
2009/0069073 A1 3/2009 Gerrard et al.
2009/0088252 A1 4/2009 Nicely et al.
2009/0088253 A1 4/2009 Oberberger et al.
2009/0104959 A1 4/2009 Caputo et al.
2009/0104975 A1 4/2009 Beaulieu et al.
2009/0104977 A1 4/2009 Zielinski
2009/0111573 A1 4/2009 Iddings
2009/0124326 A1 5/2009 Caputo et al.
2009/0124362 A1 5/2009 Cuddy et al.
2009/0143133 A1 6/2009 Baerlocher
2009/0170588 A1 7/2009 Baerlocher
2009/0280904 A1 11/2009 Nicely et al.

FOREIGN PATENT DOCUMENTS

CA 2527416 5/2007
EP 1 672 596 6/2006
GB 2 161 008 1/1986
WO WO 98/51384 11/1998
WO WO 00/20082 4/2000
WO WO 01/91075 11/2001
WO WO 2005/110563 11/2005
WO WO 2006/014833 2/2006
WO WO 2006/045113 4/2006
WO WO 2006/096752 9/2006
WO WO 2007/006002 1/2007
WO WO 2007/044785 4/2007

OTHER PUBLICATIONS

EZ-Pay and Related Brochures, written by IGT, published in Dec. 2000. (15 pages).
Fire Opals Multiway Xtra Video Slots Advertisement, written by IGT, published in Apr. 2009. (1 page).
Gamblers Bonus Advertisement [online] [retrieved on Nov. 20, 2007]. Retrieved from the Internet at <URL: http://www.gamblersbonus.com>. (5 pages).
Global Player Casino Blackjack Game Rules Screen Shot [online] [retrieved on Apr. 1, 2008, publication date unknown]. Retrieved from the Internet at <URL: www.global-player.com>. (5 pages).
Golden Palace Multi Table Tournaments Game Description [online] [retrieved on Apr. 4, 2008, publication date unknown]. Retrieved from the Internet at <URL: http://www.goldenpalacepoker.com/tournaments.html>. (13 pages).
IGT Gaming Systems Brochure, written by IGT, published in 2002. (16 pages).
Instant Slotto Article, written by Strictly Slots, published in Apr. 2001. (3 pages).
InterCasino Blackjack Game Rules [online] [retrieved on Apr. 1, 2008, publication date unknown]. Retrieved from the Internet at <URL: http://www.intercasino.com/games/blackjack/>. (8 pages).

InterCasino Craps Game Rules [online] [retrieved on Apr. 1, 2008, publication date unknown]. Retrieved from the Internet at <URL: http://www.intercasino.com/games/craps/>. (10 pages).
InterCasino Multi Line Slots Game Rules [online] [retrieved on Apr. 2, 2008, publication date unknown]. Retrieved from the Internet at <URL: http://www.intercasino.com/hlep/rules/multilineslots.shtml>. (49 pages).
InterCasino Roulette Game Rules [online] [retrieved on Apr. 1, 2008, publication date unknown]. Retrieved from the Internet at <URL: http://www.intercasino.com/games/roulette/>. (7 pages).
InterCasino Slots Game Rules [online] [retrieved on Apr. 1, 2008, publication date unknown]. Retrieved from the Internet at <URL: http://www.intercasino.com/games/slots/>. (13 pages).
InterCasino Tournaments Game Rules [online] [retrieved on Mar. 31, 2008, publication date unknown]. Retrieved from the Internet at <URL: http://www.intercasino.com/help/rules/tournaments.shtml>. (5 pages).
Lasseters Aztec Game Rules [online] [retrieved on Apr. 2, 2008, publication date unknown]. Retrieved from the Internet at <URL: http://www.lasseters.com/game/rules/las_aztec.jsp>. (3 pages).
Lasseters Hollywood Legends Game Rules [online] [retrieved on Apr. 2, 2008, publication date unknown]. Retrieved from the Internet at <URL: https://austrust.lasseters.com.au/en/rules/help/html/HollywoodLegens.html>. (3 pages).
Lasseters Psychedelia Game Rules [online] [retrieved on Apr. 2, 2008, publication date unknown]. Retrieved from the Internet at <URL: https://austrust.lasseters.com.au/en/rules/help/html/Psychedelia.html>. (3 pages).
Omni Casino Private Room Explanation [online] [retrieved on Apr. 2, 2008, publication date unknown]. Retrieved from the Internet at <URL: http://www.omnicasino.com>. (1 page).
Omni Casino What is a Tournament? Explanation [online] [retrieved on Apr. 2, 2008, publication date unknown]. Retrieved from the Internet at <URL: http://www.omnicasino.com>. (4 pages).
Parabol Casino Tournament Game Rules Screen Shot [online] [retrieved on Apr. 1, 2008, publication date unknown]. Retrieved from the Internet at <URL: www.parabolcasino.com>. (1 page).
Reel 'Em In-Big Bass Bucks Article, published by Strictly Slots in Aug. 2005. (1 page).
Reviews on Tetris Deluxe (GB) at dooyoo.co.uk website (www.dooyoo.co.uk/gameboy-game/tetris-deluxe/reviews/, 9 pages).
Silver Strike Advertisement and Pictures, written by Anchor Gaming, published in Dec. 1997. (3 pages).
Starluck.com World Slots Tournament Rules Screen Shots [online] [retrieved on Apr. 4, 2008, publication date unknown]. Retrieved from the Internet at <URL: www.starluck.com>. (2 pages).
Take Your Pick Article, written by Strictly Slots, published in Mar. 2001. (1 page).
Team Tiger News 2-Stage Freeroll Tournaments News Letter sent Apr. 19, 2004 from TigerGaming.com. (2 pages).
Team Tiger News "Winner Take ALL" Tournament News Letter Apr. 2004 from TigerGaming.com. (2 pages).
Tournamania Advertisement, written by Atronic Casino Technology, Ltd., published in 2005. (2 pages).
William Hill 3 Card Poker Game Rules [online] [retrieved on Apr. 1, 2008, publication date unknown]. Retrieved from the Internet at <URL: http://www.williamhillcasino.com/rules_poker_3_card.htm>. (3 pages).
William Hill Multi-Hand Blackjack Game Rules [online] [retrieved on Apr. 1, 2008, publication date unknown]. Retrieved from the Internet at <URL: http://www.williamhillcasino.com/rules_blackjack_multi-hand.htm>. (4 pages).
William Hill Multi-Player Blackjack Game Rules [online] [retrieved on Apr. 1, 2008, publication date unknown]. Retrieved from the Internet at <URL: http://www.williamhillcasino.com/rules_blackjack_multi.htm>. (5 pages).
William Hill One Spin Wonder Roulette Game Rules [online] [retrieved on May 12, 2008, publication date unknown]. Retrieved from the Internet at <URL: http://www.williamhillcasino.com>. (2 pages).
William Hill Single Player Blackjack/Multi-Split Blackjack Game Rules [online] [retrieved on Apr. 1, 2008, publication date unknown]. Retrieved from the Internet at <URL: http://www.williamhillcasino.com/rules_blackjack_single.htm>. (4 pages).
William Hill Slots Game Rules [online] [retrieved on Apr. 1, 2008, publication date unknown]. Retrieved from the Internet at <URL: http://www.williamhillcasino.com/rules_slots.htm>. (9 pages).
Wolf Run Multiplay Advertisement, written by IGT, published in 2008. (1 page).
Wolf Run Video Slot Game Description [online] [retrieved on Mar. 15, 2011, publication date unknown]. Retrieved from the Internet at <URL: http://www.5starslots.com/slots/wolf-run-ww.html>. (3 pages).

* cited by examiner

FIG. 4

200

| Player (202) | Tournament Award Initial Games Provided (204) | Games Played (206) | Average Tournament Game Value (208) |
|---|---|---|---|
| 210 — 1 | 10 | 6 | $1 |
| 212 — 2 | 10 | 6 | $1 |
| 214 — 3 | 10 | 4 | $1 |
| 216 — 4 | 10 | 4 | $1 |
| 5 | 10 | 10 | $1 |
| 6 | 10 | 10 | $1 |
| Tournament Award | | | $20 (220) |

FIG. 5

300

| Player (302) | Tournament Award Initial Games Provided (304) | Games Played (306) | Average Tournament Game Value (308) | Multiplier (310) |
|---|---|---|---|---|
| 312 — 1 | 10 | 6 | $1 | 2 |
| 314 — 2 | 10 | 6 | $1 | 6 |
| 316 — 3 | 10 | 4 | $1 | 4 |
| 318 — 4 | 10 | 4 | $1 | 2 |
| 5 | 10 | 10 | $1 | 2 |
| 6 | 10 | 10 | $1 | 3 |
| Tournament Award | | | | $68 (320) |

FIG. 6E

404

| Game 4 Tournament Award | | | |
|---|---|---|---|
| 406 Player | 408 Games Provided | 410 Games Played | 412 Average Tournament Value of Game |
| 1 | 10 | still playing | 1 credit |
| 2 | 10 | still playing | 1 credit |
| 3 | 10 | still playing | 1 credit |
| 4 | 10 | still playing | 1 credit |
| 5 | 10 | still playing | 1 credit |
| 414 6 | 10 | 4 | 1 credit |
| 7 | 10 | still playing | 1 credit |
| 8 | 10 | still playing | 1 credit |
| 416 9 | 10 | 4 | 1 credit |
| 10 | 10 | still playing | 1 credit |
| (6)(1) + (6)(1) = 12 credits | | | |

FIG. 6G

420

Game 8
Tournament Award

| Player (406) | Games Provided (408) | Games Played (410) | Average Tournament Value of Game (412) |
|---|---|---|---|
| 1 | 10 | still playing | 1 credit |
| 2 | 10 | still playing | 1 credit |
| 3 | 10 | still playing | 1 credit |
| 4 (420) | 10 | 8 | 1 credit |
| 5 | 10 | still playing | 1 credit |
| 6 | 10 | 4 | 1 credit |
| 7 (422) | 10 | 8 | 1 credit |
| 8 | 10 | still playing | 1 credit |
| 9 | 10 | 4 | 1 credit |
| 10 | 10 | still playing | 1 credit |

(6)(1) + (6)(1) + (2)(1) + (2)(1) = 16 credits

FIG. 7C
500
Player 2 - Non-Tournament Game
502
BAR
BAR
BAR
Congratulations!
You got ☆☆☆ again.
You now have a 2X multiplier.
The tournament starts now!

FIG. 7D

504

| Players (506) | Multipliers (508) |
|---|---|
| 1 | 1X |
| 2 | 2X |
| 3 | 4X |
| 4 | 8X |
| 5 | 2X |

FIG. 7G

516

| Leaderboard - Game 5 | |
|---|---|
| 1 | 50 - Final |
| 2 | 550 |
| 3 | 700 |
| 4 | 890 |
| 5 | 300 - Final |
| Players 1 & 5 - You are eliminated! | |

FIG. 7H

518

Tournament Award

| Players | Initial Games | Games Played | Game Value | Multiplier |
|---|---|---|---|---|
| 1 | 10 | 5 | 10 | 1X |
| 2 | 10 | still playing | 10 | 2X |
| 3 | 10 | still playing | 10 | 4X |
| 4 | 10 | still playing | 10 | 8X |
| 5 | 10 | 5 | 10 | 2X |

50 + 100 = 150 credits in the tournament pot!

FIG. 7I

518

| Leaderboard - Game 8 | |
|---|---|
| Player | Score |
| 1 | 50 - Final |
| 2 | 800 - Final |
| 3 | 825 |
| 4 | 1050 |
| 5 | 300 - Final |
| Players 2 - You are eliminated! | |

FIG. 7J

| Tournament Award Game 8 | | | | |
|---|---|---|---|---|
| Players | Initial Games | Games Played | Game Value | Multiplier |
| 1 | 10 | 5 | 10 | 1X |
| 2 | 10 | 8 | 10 | 2X |
| 3 | 10 | still playing | 10 | 4X |
| 4 | 10 | 1 | 10 | 8X |
| 5 | 10 | 5 | 10 | 2X |
| Tournament Award of 190 credits (5x10x1)+(2x10x2)+(5x10x2) | | | | |

FIG. 7K

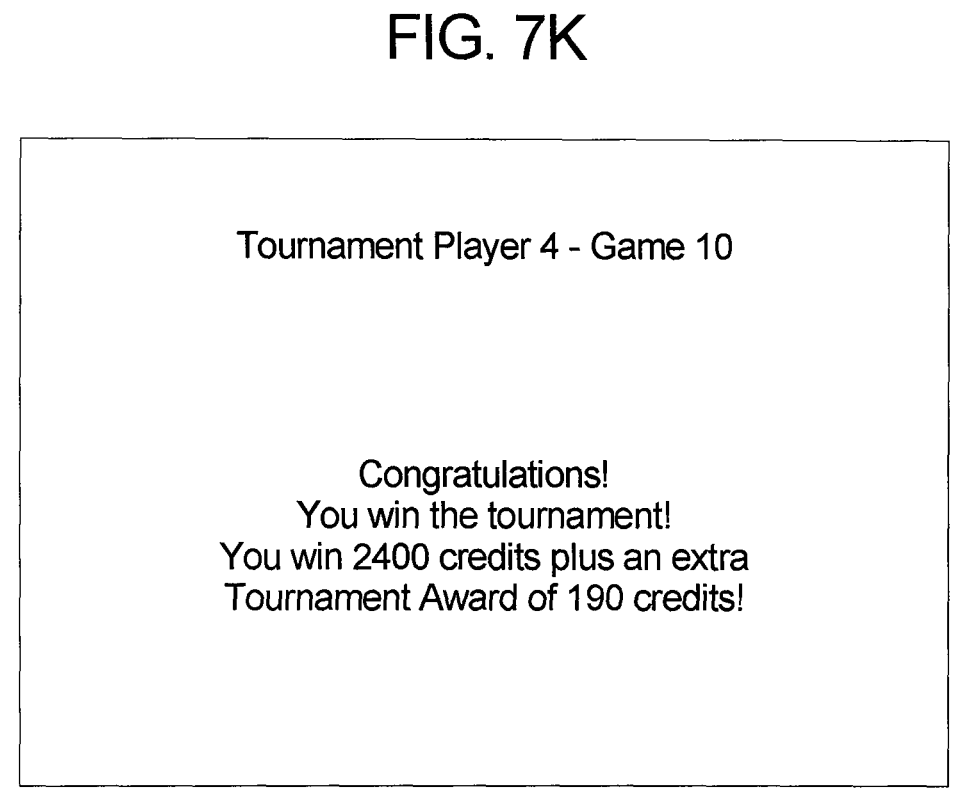

Tournament Player 4 - Game 10

Congratulations!
You win the tournament!
You win 2400 credits plus an extra
Tournament Award of 190 credits!

GAMING SYSTEM AND METHOD FOR SELECTIVELY PROVIDING AN ELIMINATION TOURNAMENT THAT FUNDS AN AWARD THROUGH EXPECTED VALUES OF UNPLAYED TOURNAMENT GAMES OF ELIMINATED PLAYERS

PRIORITY CLAIM

This application claims the benefit of and priority to U.S. Provisional Patent Application No. 61/238,458, filed on Aug. 31, 2009, entitled "GAMING SYSTEM AND METHOD FOR SELECTIVELY PROVIDING AN ELIMINATION TOURNAMENT THAT FUNDS AN AWARD THROUGH EXPECTED VALUES OF UNPLAYED TOURNAMENT GAMES OF ELIMINATED PLAYERS," the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make wagering gaming devices that provide as much enjoyment, entertainment and excitement as possible for players. Gaming tournaments, such as slot tournaments, are exciting for certain players and are a widely used form of casino promotion. Generally, a slot tournament is a group event where a plurality of players pay for or otherwise qualify to join the tournament. The players individually play the tournament on designated gaming machines. These designated gaming machines have the same gaming machine paytables. The players may either play the same number of games, play for the same allotted period of time or play with the same allotted initial amount of money or number of credits. The winner of the tournament is typically determined based on a highest tournament point score or a highest individual game score. At an end of the tournament, the gaming establishment provides the tournament winner an award.

Tournament awards are frequently funded with buy ins or with marketing dollars. Typically, the award for the tournament is a static award that is determined prior to the tournament. This award is frequently advertised with the tournament.

Therefore, there is a need for a new gaming system to improve aspects of the funding of tournament awards and to make tournaments even more exciting.

SUMMARY

One embodiment of the present disclosure relates to a gaming system including a central server or controller configured to communicate a plurality of different commands, instructions or other communications to a plurality of gaming devices to provide non-tournament game play and provide an elimination tournament upon an occurrence of a tournament triggering event. In one embodiment, during tournament play, the gaming system provides each of the players of the gaming devices a same initial number of the tournament games. In one embodiment, each of the tournament games are free for the players. In another embodiment, the gaming system requires one or more players to each pay at the beginning of the tournament. In another embodiment, the gaming system requires one or more players to pay for each play of the tournament game as further discussed below. Each of the players tries to collect as many credits as they can during the play of these tournament games. The gaming system accumulates any credits won in the tournament games for each player. In one embodiment, the gaming system provides each of the credits won during the tournament to each of the players at the end of the player's tournament. The gaming system eliminates one or more players from the tournament upon the occurrence of a player elimination triggering event during the tournament. For each eliminated player, the gaming system applies the average expected tournament game payout value of each initially provided and unplayed tournament game to a tournament award. That is, the gaming system adds an average expected payout value of each unplayed tournament game of each eliminated player to the tournament award. In this manner, one or more players may be eliminated from the tournament at the same time or at different times. The gaming system determines one or a plurality of tournament winners at the end of the tournament and provides the tournament winner the tournament award. Therefore, in one embodiment, the gaming system provides a tournament winner all of the credits won in the tournament by that player and a tournament award that includes the sum of the average expected payout value of each unplayed tournament game from each eliminated player. In one such embodiment, each of the players who do not win the tournament are provided all of the credits that player won during play of the initial number of free tournament games.

In certain embodiments, the gaming system provides one or more players a tournament advantage or tournament element. In one embodiment, the gaming system determines the tournament advantage or tournament element to provide to each player based on one or more aspects of the player's non-tournament game play or base game play. For example, in one embodiment, the gaming system provides a player tournament entry based on an outcome generated in a non-tournament game. The gaming system determines the tournament advantage or tournament element to provide the player based on how much the player wagered on the non-tournament game that generated the tournament qualifying outcome. It should be appreciated that in different embodiments any multiplier provided relates linearly or non-linearly to the wager amount placed. For example, if the player wagered two credits a payline in the non-tournament game, the gaming system provides the player a multiplier of 2 that applies to each of the player's tournament games. If the player wagers 5 credits per payline in the non-tournament game that generated the tournament qualifying outcome, the gaming system provides the player a multiplier of 4 that applies to each game of the tournament. Therefore, in certain embodiments, the tournament advantage or tournament element greatly influences the outcome of the tournament.

It should be appreciated that in certain embodiments that include different tournament advantages or different tournament elements for different players that the tournament award changes during the tournament depending on which players are eliminated and how many games those players played before being eliminated. For example, each of the tournament games is valued at 2 credits and a player elimination triggering event occurs with 10 games remaining in the tournament. The gaming system would allocate 40 credits to the tournament award if a first player with a multiplier of 2 is eliminated (10 games×2 credits×2 multiplier). However, if a player with a multiplier of 10 is eliminated, the gaming system would allocate 200 credits to the tournament award (10 games×2 credits×10 multiplier). It should thus be appreciated that in certain embodiments, the tournament award is a dynamically changing award that provides added excitement to the tournament.

It should also be appreciated that players may be eliminated from the tournament in any suitable manner. In one embodiment, the player elimination triggering event is a designated number of tournament games being played. That is, a designated number of players are eliminated after a designated number of tournament games have been played. In another embodiment, the player elimination triggering event is passage of a designated amount of time during the tournament. That is, a designated number of players are eliminated after a passage of a designated amount of time.

The gaming system may determine how many players to eliminate upon an occurrence of a player elimination triggering event based on any suitable element of the tournament. In certain embodiments, how many players are eliminated upon the occurrence of a player elimination triggering event is determined, at least in part, by the number of players participating in the tournament. For example, the bottom 10% of players are eliminated upon the occurrence of each player elimination triggering event. In another example, the bottom 10% of players are eliminated upon an occurrence of a first player elimination triggering event at a first point in time and the bottom 50% of players are eliminated upon an occurrence of a second, later player elimination triggering event at a subsequent second point in time. In another embodiment, the gaming system determines which players to eliminate based on an elimination threshold. For example, all players that have below 100 points are eliminated upon an occurrence of a first player elimination triggering event.

Accordingly, the gaming system disclosed herein provides a tournament with a tournament award that includes the average expected payout values of each of the tournament games that are initially provided to one or more players and not played by those players due to the elimination of those players from the tournament. In one embodiment, the gaming system disclosed herein additionally provides different tournament elements or different tournament advantages to one or more different tournament players of a same tournament. Thus, in certain embodiments, the gaming system herein provides a tournament award that changes during tournament play.

Additional features and advantages are described in, and will be apparent from, the following Detailed Description and the figures.

BRIEF DESCRIPTION OF THE FIGURES

FIG. 4 is a chart illustrating the value of a tournament award where the average expected tournament game value is the same for each of the players.

FIG. 5 is a chart illustrating the value of a tournament award where the average expected tournament game value is the same for each of the players with each of the players having multipliers that change the value of the tournament award as the players are eliminated.

FIGS. 6E and 6G are charts that illustrate the value and calculation of the tournament award at different games during the tournament of FIGS. 6A, 6B, 6C, 6D, and 6F.

FIGS. 7A, 7B, 7C, 7E, 7F, and 7K are screen shots that illustrate one embodiment of different players' tournament play where each of the players has a multiplier in the tournament.

FIG. 7D is a chart illustrating which players of the tournament have which multipliers.

FIG. 7G is common display showing the standings of the players of the tournament.

FIGS. 7H, 7I, and 7J are charts that illustrate the value and calculation of the tournament award at different tournament games.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions or tournament games are executed by a central server in a thin client configuration.

Figure 1A:
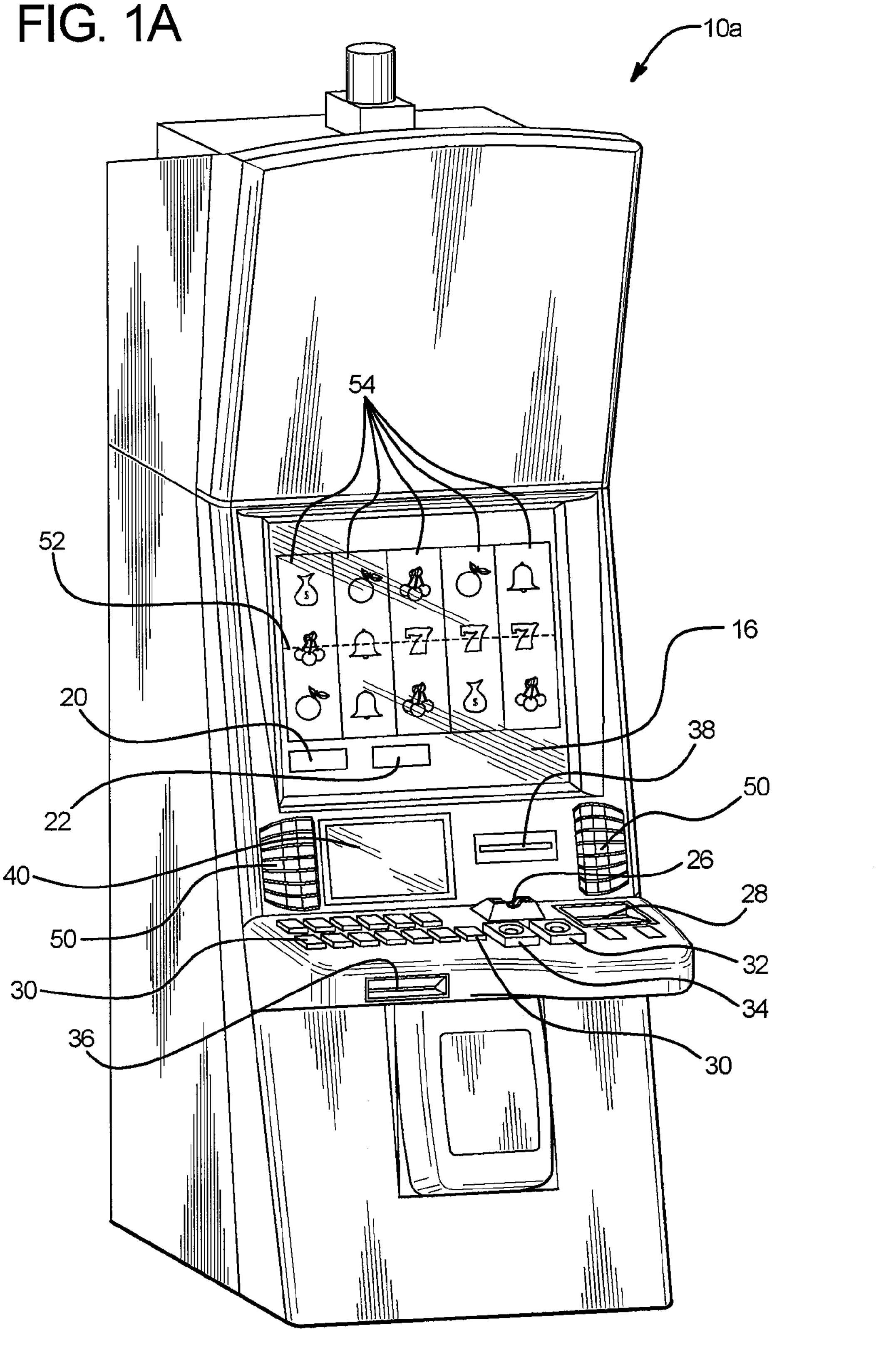
FIGS. 1A and 1B are perspective views of alternative embodiments of the gaming device of the gaming system disclosed herein.
Figure 1B:
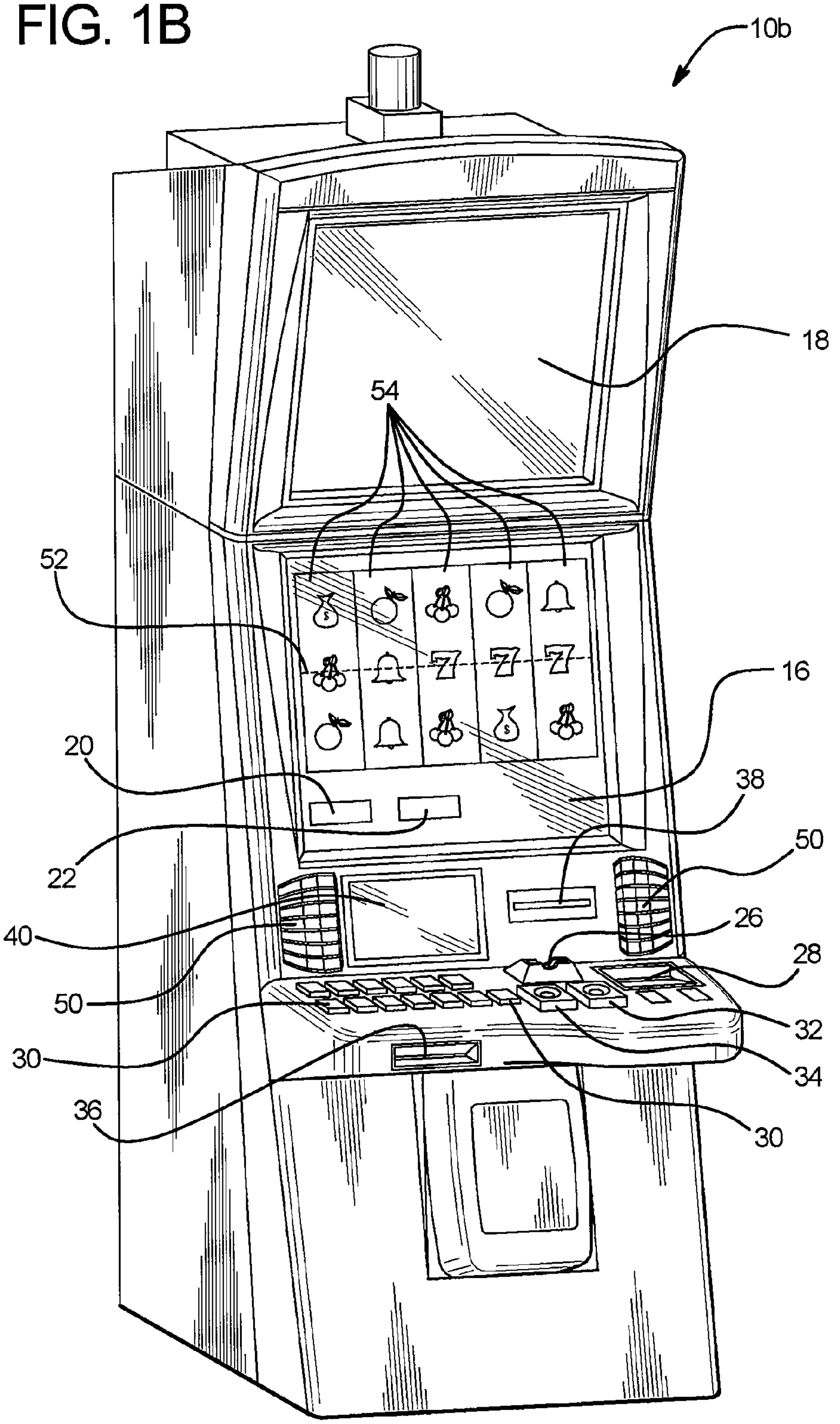

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
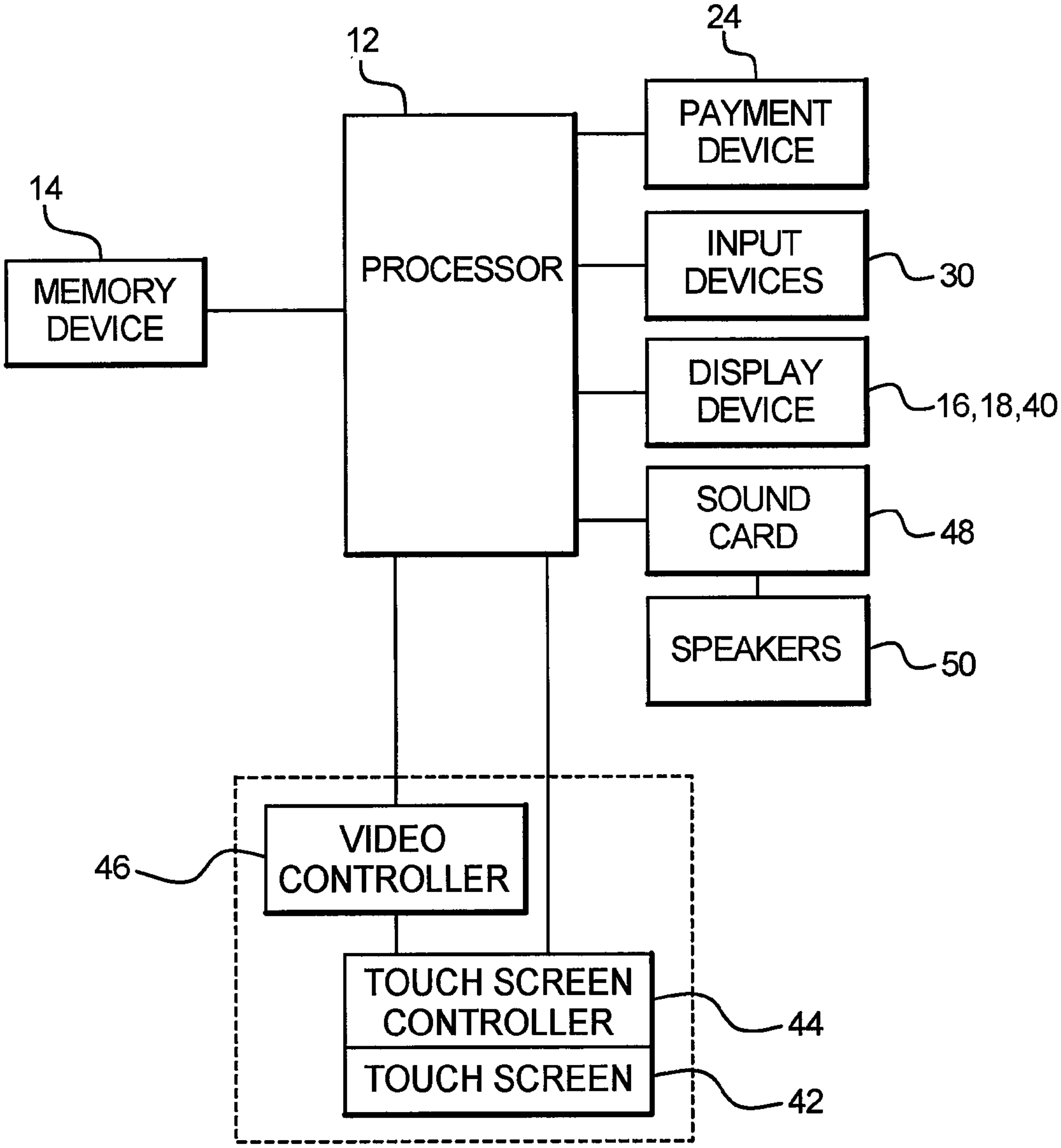
FIG. 2A is a schematic block diagram of the electronic configuration of one embodiment of the gaming system disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

In another embodiment, at least one display device is a common display device that is operable to simultaneously display information to a plurality of players. The common display device may display tournament standings, tournament points, tournament player information, updated information about the tournament award and any other tournament information.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game and/or tournament game or by playing music for other modes of the gaming device, such as an attract mode. In one embodiment, the music changes based on events in the tournament. For example, as the tournament continues the music changes such as becoming faster or changes to different songs or types of music after a tournament elimination. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia. In another example, the camera may acquire the image of the tournament winner to display to others in the gaming establishment of the tournament or may be used for promotions for future tournaments.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

The tournament game may comprise any suitable reel-type game, card game, cascading or falling symbol game, number game, or other game of chance susceptible to representation in an electronic or electromechanical form, which in one embodiment produces a random outcome based on probability data and may or more not require placement of a wager.

In one embodiment, as illustrated in FIGS. 1A and 1B, a base or primary game or tournament game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game or tournament game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary or tournament game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game or tournament game may be a keno game wherein the gaming device displays a plurality of selectable indicia or numbers on at least one of the display devices. In this embodiment, the player selects at least one bit potentially a plurality of the selectable indicia or numbers via an input device such as a touch screen.

The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round or in a tournament. The bonus game, secondary game or tournament enables the player to obtain a prize or payout in addition to the prize or payout, if any, obtained from the base or primary game. In general, a bonus or secondary game or a tournament produces a significantly higher level of player excitement than the base or primary game because it provides a greater expectation of winning than the base or primary game, and is accompanied with more attractive or unusual features than the base or primary game. In one embodiment, the bonus or secondary game or tournament game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game or tournament is needed. That is, a player may not purchase entry into a bonus game or tournament; rather they must win or earn entry through play of the primary game, thus encouraging play of the primary game. In another embodiment, qualification of the bonus or secondary game or tournament is accomplished through a simple "buy-in" by the player—for example, if the player has been unsuccessful at qualifying through other specified activities. In another embodiment, the player must make a separate side-wager on the bonus game or tournament or wager a designated amount in the primary game to qualify for the secondary game or tournament. In this embodiment, the secondary game triggering event must occur and the side-wager (or designated primary game wager amount) must have been placed to trigger the secondary game.

Figure 2B:
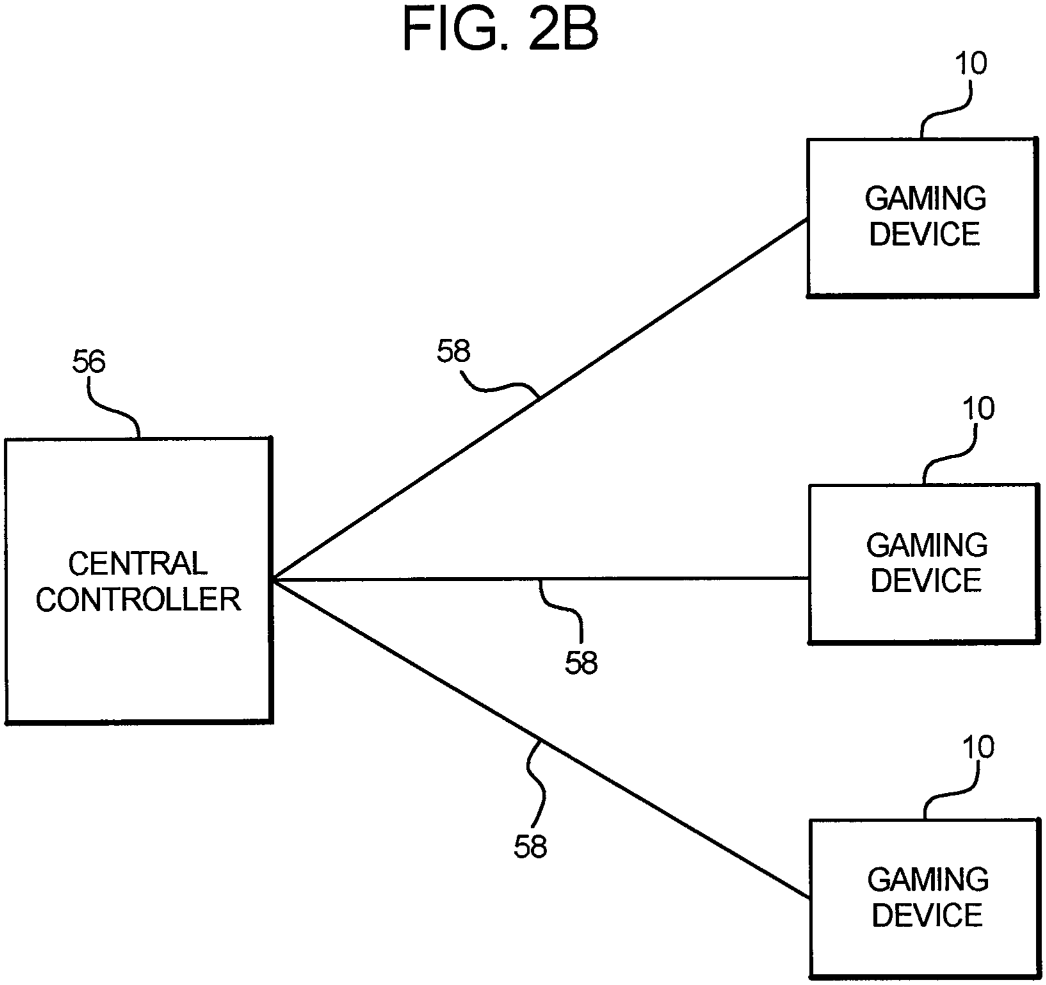
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device. In one embodiment, the service window displays tournament information or tournament games to the players. That is, the service window is used to relay information about the tournament to the players. In one such embodiment, the gaming system enables the players to play non-tournament games and simultaneously displays tournament information or games via the service window and non-tournament games.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

In one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards.

Tournament Play

Figure 3:
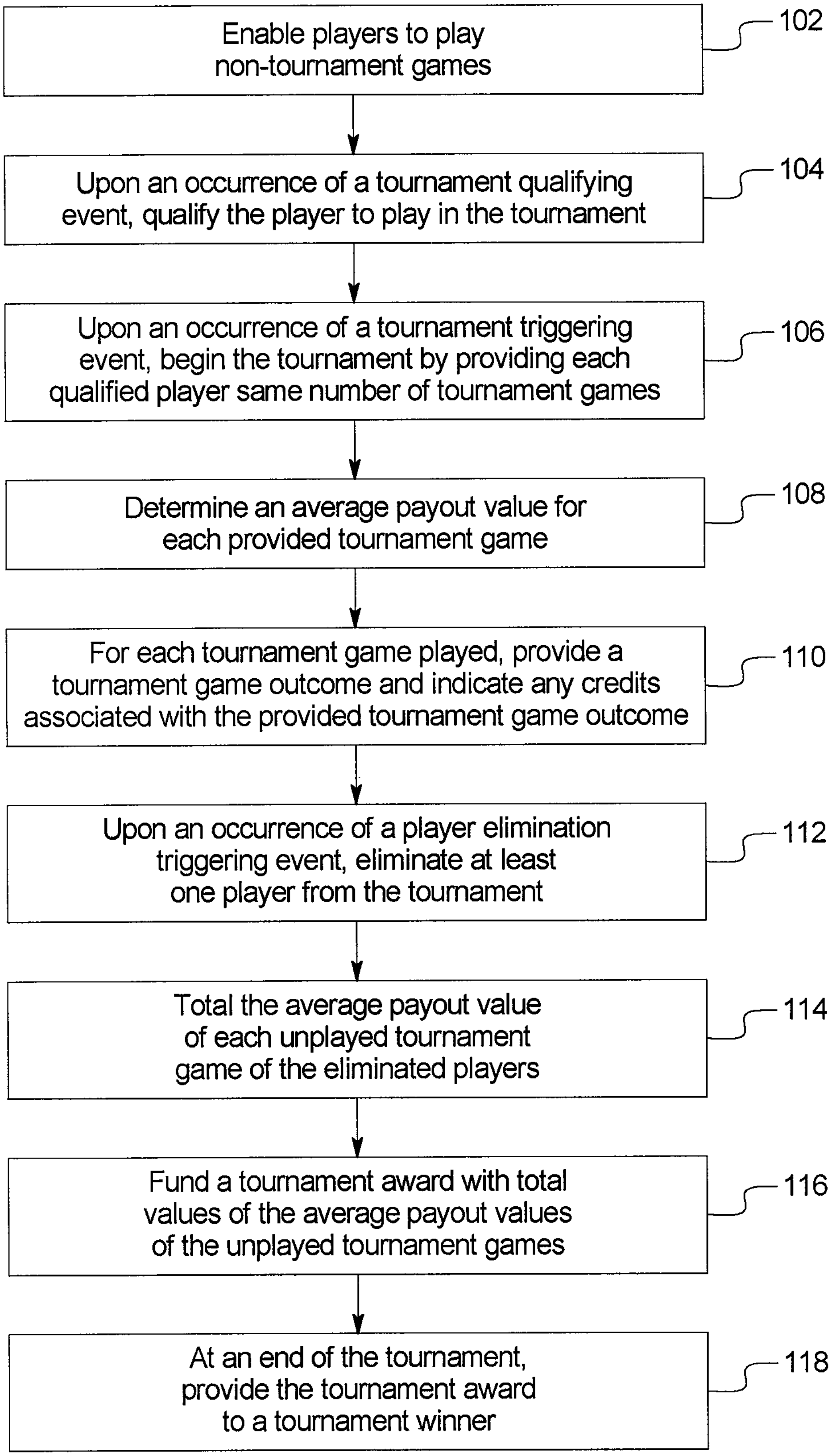
FIG. 3 is a flow chart of one method of one embodiment of the tournament.

As illustrated in FIG. 3, in one embodiment the gaming system enables players to play non-tournament games at a plurality of gaming machines as illustrated in block 102. In one embodiment, upon an occurrence of tournament qualifying event at one of the gaming machines, the gaming system qualifies the player at that gaming machine to play in the tournament as illustrated in block 104. It should be appreciated that the gaming system may determine the tournament qualifications for the players in any suitable manner.

As illustrated in FIG. 3, upon an occurrence of a tournament triggering event, in one embodiment, the gaming system begins the tournament by providing each qualified player a same number of initial tournament games as illustrated in block 106. In one embodiment, the gaming system provides each award won by each player during the play of the tournament games to that player. It should be appreciated that the tournament game may be any suitable type of game. In one embodiment, all of the tournament games are the same types of games. For example, the gaming system provides each player 10 slot games in the tournament. The gaming system determines an average expected payout value for each provided tournament game. In one embodiment, each of the players is provided the same type of tournament game and has the same average expected payout value for each provided tournament game. For example, in one embodiment the average expected payout value of each provided tournament game is one dollar. In another embodiment, one or more players' tournament games have different average expected payout values. For example, player 1 has an average expected tournament game payout value of 2 dollars and player 2 has an average expected tournament game payout value of 3 dollars.

As illustrated in block 108, the gaming system provides a tournament game outcome for each tournament game played, and indicates any credits associated with the provided tournament outcome. For example, if the player is playing a slot game and wins 10 credits from that slot game, the gaming system indicates to the player that they win 10 credits. The gaming system accumulates or tracks each of the player's credits to determine the elimination of the players and the winner of the tournament. In one embodiment, the gaming system provides the players the number of credits won in the tournament. For example, if the player wins 50 credits in the tournament, at the end of the play of that player's tournament, the gaming system enables the player to cash out and keep those 50 credits.

As illustrated in block 110, upon an occurrence of a player elimination triggering event, the gaming system eliminates at least one player from the tournament. It should be appreciated that the player elimination triggering event may be any suitable event or combinations of events including but not limited to a duration of time, a number of games played, one or more players winning a designated number of credits or points, an amount won by the players in the tournament and an operator input. In one embodiment, the player elimination triggering event is determined based on the number of players participating in the tournament.

As illustrated in block 112, the gaming system sums or accumulates the average expected payout value of each unplayed tournament game of the eliminated player(s) to add to the tournament award. For example, if the average expected payout value is 10 credits per tournament game for each tournament player and if each player is provided 10 games and two players are eliminated at game six, the gaming system would then total the values of each unplayed average expected tournament game value. At game six, the tournament award would be 80 credits ((4 unplayed games×10 credits)+(4 unplayed games×10 credits)). That is, the tournament award provided to one or more tournament winners includes the values of the average expected payout value for each of the unplayed games of the eliminated players.

As illustrated in block 114, at the end of the tournament, the gaming system provides the tournament award to at least one tournament winner.

FIGS. 4 and 5 are tables illustrating a tournament award funded by the average expected payout value of the tournament games played of the eliminated players.

As illustrated in FIG. 4, in this example embodiment, the tournament includes six players in the tournament and the gaming system provides each of the tournament players 10 games. The first column 202 includes the number of players 1 through 6. The second column 204 includes the number of initial games provided to the players which is 10 games to each of the six players. The third column 206 provides the average expected payout values of the tournament games. The fourth column 208 provides the number of tournament games played by the tournament players. The fifth column 210 provides the amount added to the tournament award upon the elimination of that player. As illustrated in the chart 200 in FIG. 4, the first player 210 is provided the 10 games and is eliminated after 6 games. The second player 212 is provided 10 games and is also eliminated after 6 games. Therefore, the gaming system adds $4 to the tournament award for each of the first two players (4 unplayed tournament games×$1 a tournament game). The third player 214 is provided 10 games and is eliminated after 4 games. The fourth player 216 is provided 10 games and is eliminated after 4 games. Therefore, the gaming system adds $6 to the tournament award for each of the third and fourth players (6 unplayed tournament games×$1 a tournament game). Therefore, the tournament award includes the average expected tournament game values of these unplayed games. The tournament award is 20 dollars which includes the average expected payout values of the unplayed games of the eliminated players. In this illustrated embodiment each of the players has a same average expected tournament game value and every aspect and element of each player's tournament play is the same.

As illustrated in FIG. 5, in one embodiment one or more players are provided an advantage in the tournament or an element of the tournament is different for one or more players. In one embodiment, the gaming system determines the advantage based on one or more elements, aspects or outcomes in a base game. As illustrated in FIG. 5, the chart 300 includes a number of players column 302, the number of tournament games provided column 304, the number of tournament games played column 306, the average expected tournament game payout value column 308, a multiplier column 310 and an amount contributed to the tournament award column 312. In one embodiment, one or more of the tournament players are provided one or more different game modifiers, such as the multipliers, based on one or more elements of the base game play that qualifies the player for the tournament.

As illustrated in FIG. 5, the first player 312 is provided 10 games and plays 6 of these games with an average expected of 1 dollar a game and a multiplier of 2. Therefore, the gaming system contributes $8 to the tournament award based on the unplayed games of player one (4 unplayed games×$1 a game×2 multiplier). The second player plays 6 games before that player is eliminated and has 4 unplayed tournament games and has a multiplier of 6. Therefore, the amount contributed to the tournament award based on the unplayed games of the second player is 24 (4 unplayed games×1 a game×6 multiplier). The third player 316 plays only 4 tournament games has a multiplier of 4. Therefore, the gaming system contributes 24 credits to the tournament award from the unplayed games from the third player (6×1×4). The fourth player also only plays 4 games but has a multiplier of 2. Therefore, the gaming system allocates 12 credits to the tournament award for the unplayed games of the fourth player (6 unplayed games×$1 a game×2 multiplier). Therefore, as illustrated in FIG. 5, the tournament award includes the average expected payout values of the unplayed games of players one, two, three and four which is 68 dollars. As illustrated FIG. 5, players 5 and 6 play all 10 games. It should be appreciated that the tournament advantage or tournament element is not limited to a multiplier but may be any suitable tournament advantage or tournament element. Additionally, in different embodiments, each player does not receive a tournament advantage or tournament element. For example, only 2 out of 10 players receive a multiplier for the tournament. In another example, 2 out of 10 players receive an extra tournament game in the tournament.

FIGS. 6A, 6B, 6C, 6D, 6E, 6F and 6G illustrate one embodiment of a tournament where the tournament qualifying event is achieving symbol combination in a base game, and the tournament elimination triggering events are a number of games played by the players. In this example, the players are eliminated based on credits won in the tournament. The players are eliminated from the tournament at the end of game 4 and game 8.

Figure 6A:
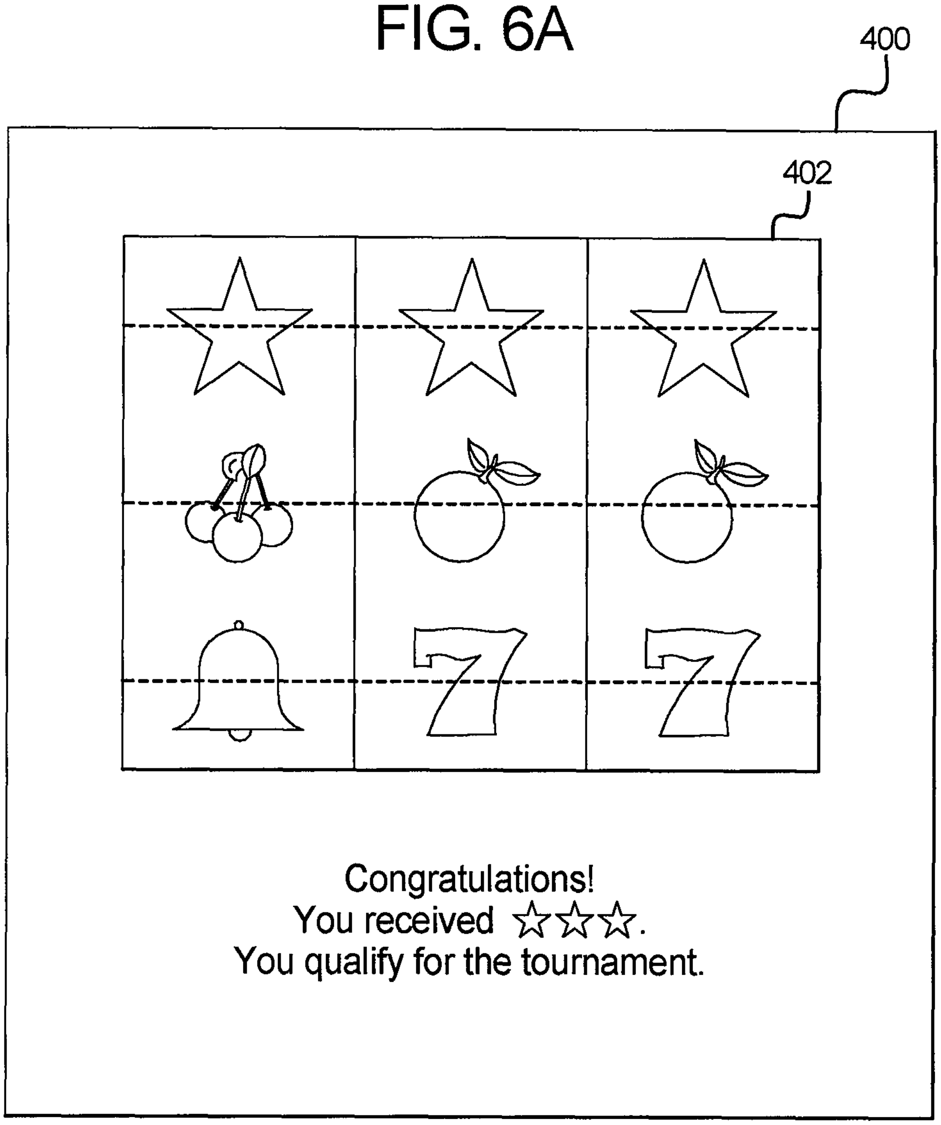
FIGS. 6A, 6B, 6C, 6D, and 6F are screen shots that illustrate one embodiment of tournament play.

As illustrated in FIG. 6A, in one embodiment, the player must obtain the symbol combination star, star, star on an active payline in a slot base game to qualify for the tournament. As illustrated in FIG. 6A, the player qualified for the tournament.

Figure 6B:
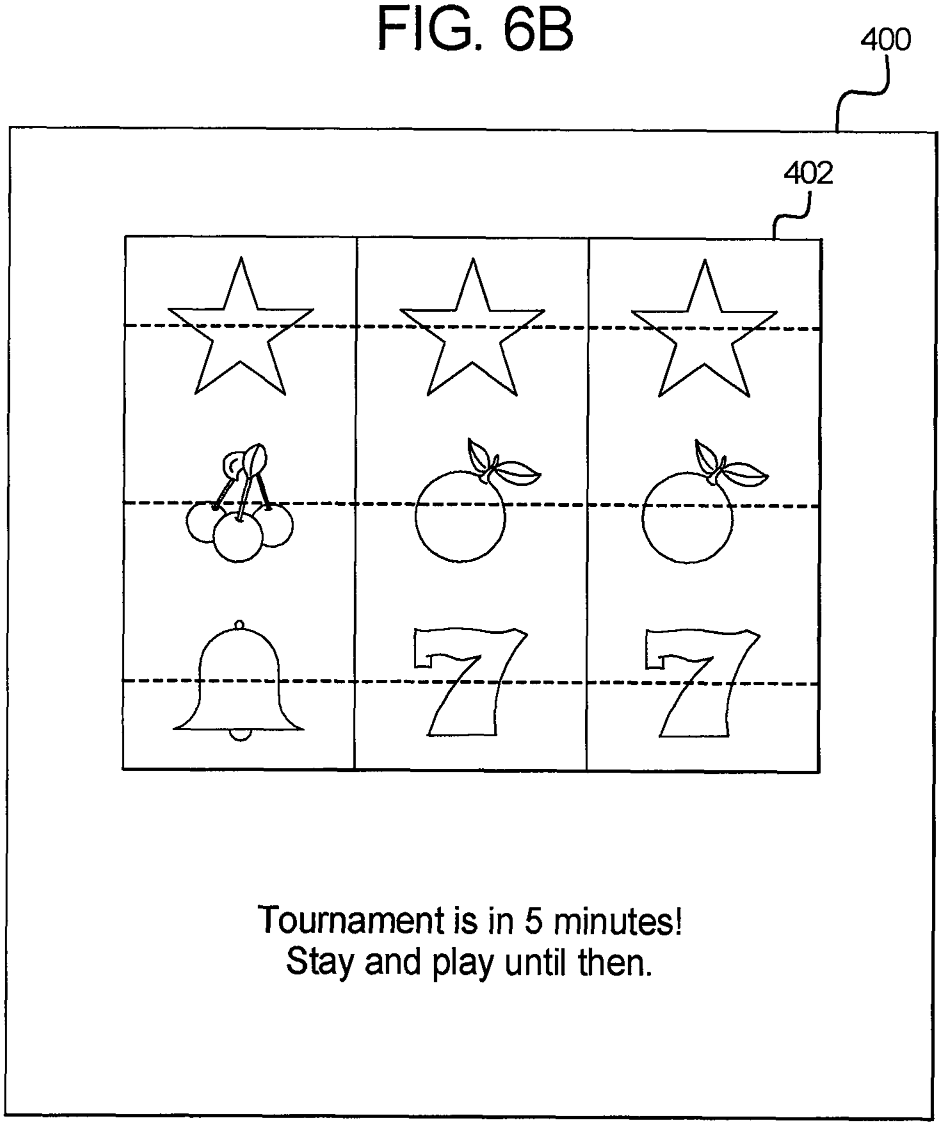

As illustrated in FIG. 6B, the gaming system informs the player that the tournament will begin in five minutes, so the player needs to stay and play awaiting the start of the tournament. In one embodiment, the player must continually actively play on the gaming device to play in the tournament.

Figure 6C:
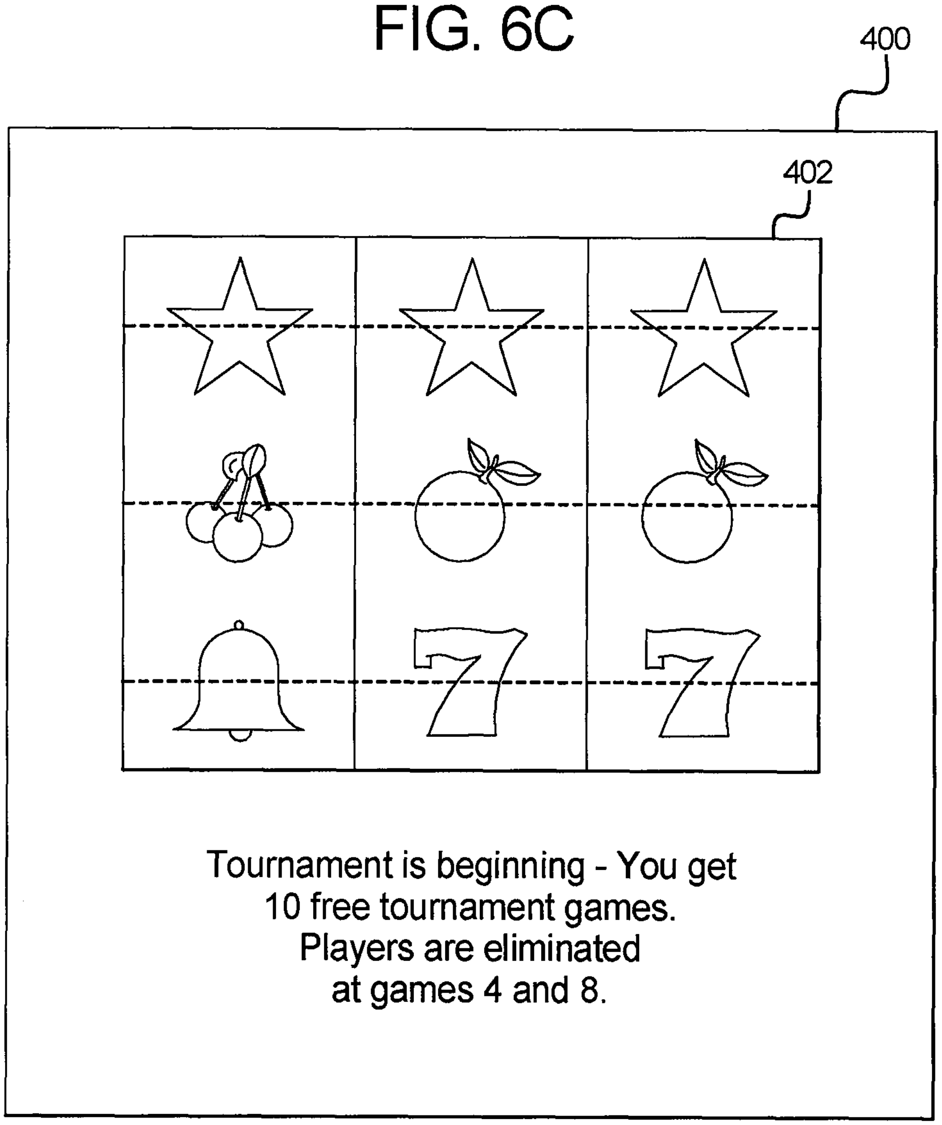

As illustrated in FIG. 6C, the gaming system informs the player (player 4 in the tournament) that the tournament is beginning and in one embodiment, the player gets 10 initial free tournament games. In one embodiment, the gaming system provides each of the players the same type and the same number of free initial tournament games.

Figure 6D:
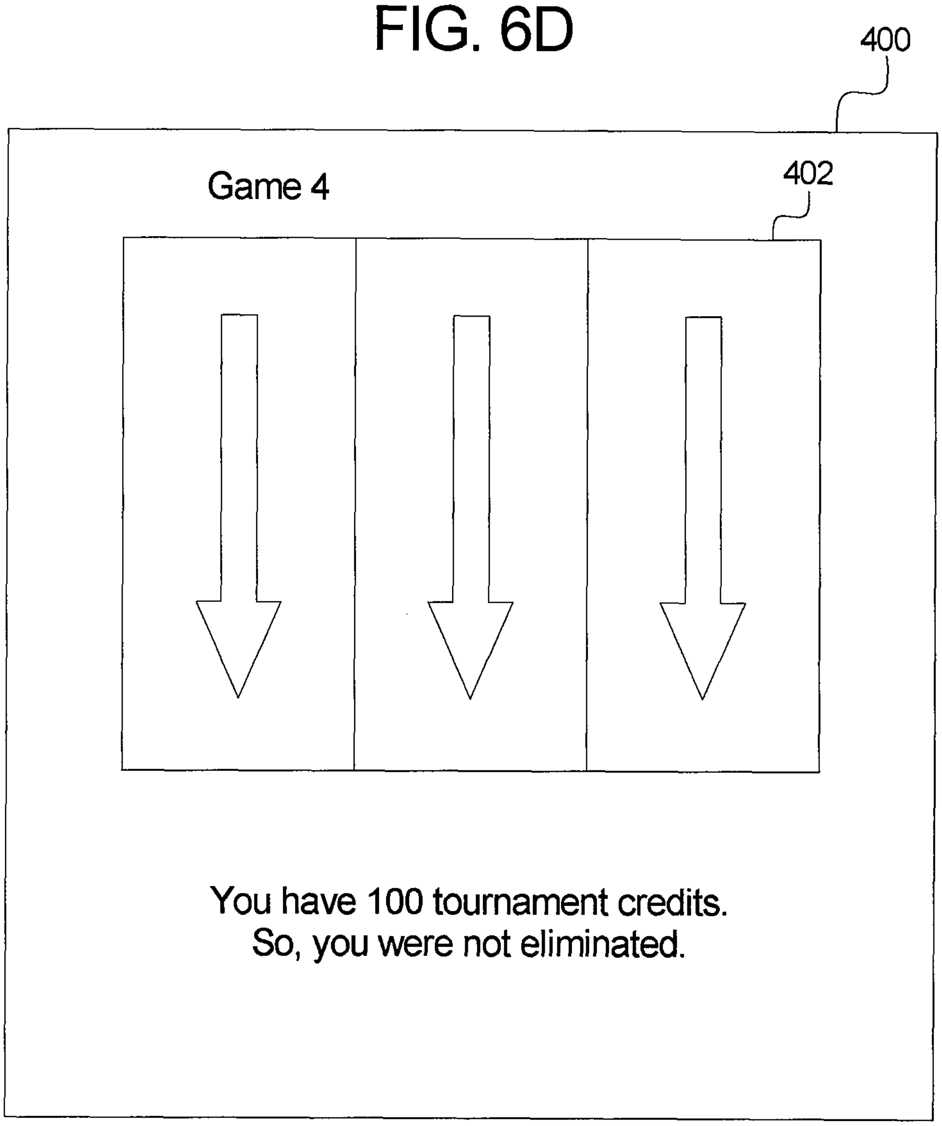

As illustrated in FIG. 6D, player four is playing the tournament. The gaming system informs the player that they have 100 tournament credits and illustrates game 4 of the tournament for that player. The gaming system informs the player that they were not eliminated because they have 100 tournament credits.

FIG. 6E is a chart 404 that illustrates the tournament award at the end of game 4. The chart illustrates that there are 10 players in the tournament in the first column 406. The gaming system provides each of the 10 players 10 free tournament games at the beginning of the tournament as illustrated in the second column 408. The third column 410 illustrates how many tournament games were actually played by each player during the tournament. The fourth column 412 illustrates the average expected tournament game payout value which is 1 credit. The fifth column 413 illustrates the amount contributed to the tournament award based on each of the eliminated players.

As illustrated in FIG. 6E, player 6 indicated by number 414 and player 9 indicated by number 416 were each eliminated after game 4 of the tournament. Therefore, player 6 and player 9 each only played 4 games of the tournament. Therefore, the tournament award at the end of game 4 includes the average expected payout values of the 6 unplayed games for each of the 2 players valued at 1 credit per game. At the end of Game 4, the tournament award is 12 credits.

Figure 6F:
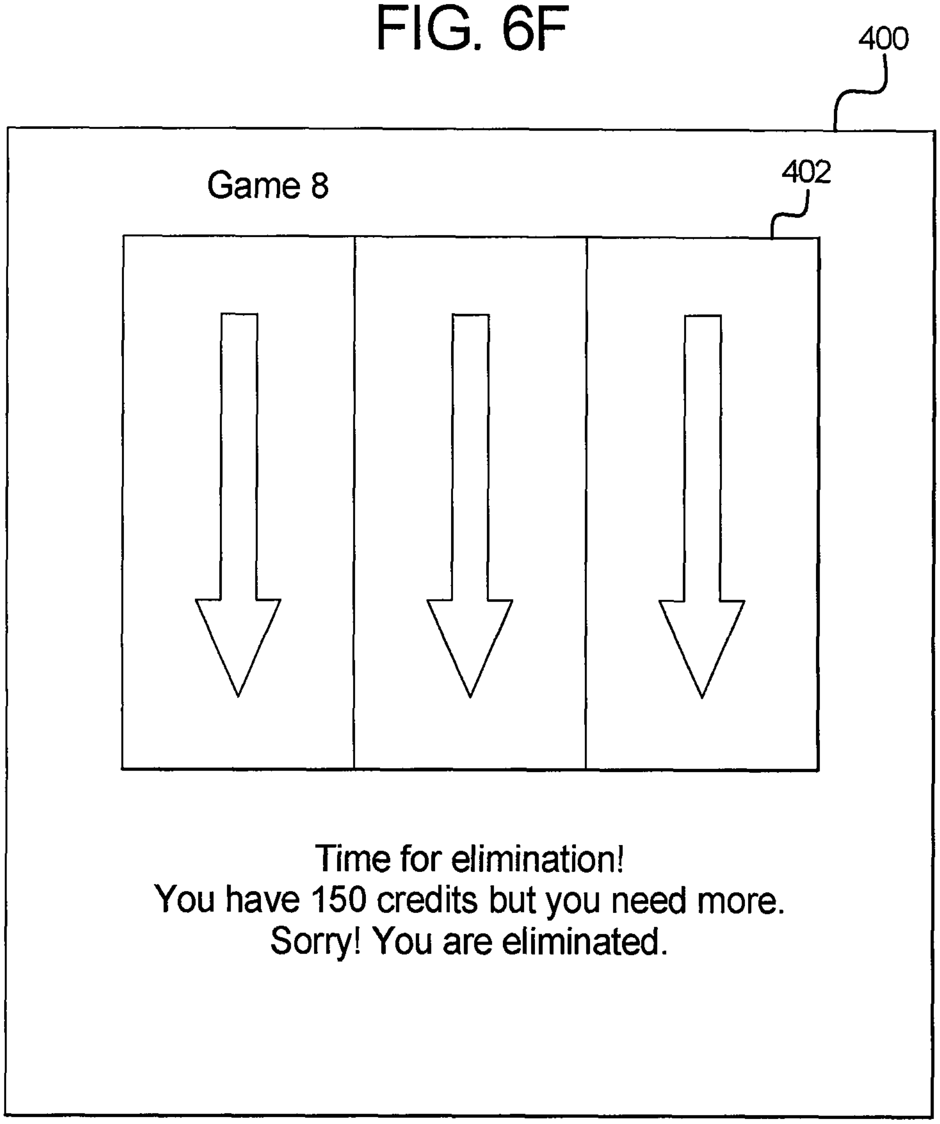

As illustrated in FIG. 6F, the gaming system eliminates 2 more players at the end of game 8. Player four is eliminated because the player has 150 credits, but the player needed more to be in the top 6 players of the tournament. In one embodiment, the elimination is based on the number of credits the players won in the tournament. The gaming system determines which players to eliminate based on the number of credits they have won in the tournament.

FIG. 6G is a chart 420 that illustrates the tournament award at the end of game 8. At game 8, players 1, 2, 3, 5, 8, and 10 are still playing the tournament. Therefore, the gaming system does not contribute any credits to the tournament awards based on those players. The tournament award includes the 12 credits accumulated from the prior two players 6 and 9 being eliminated from the tournament. The tournament award now includes an additional 4 credits from players 4 and 7 which were eliminated from the tournament. That is, player 4 indicated by number 420 and player 7 indicated by number 422 each played 8 games in the tournament, and therefore, do not play 2 games of the tournament with the value of 1 credit per game. Therefore, the tournament award at the end of game 8 is 16 credits. The tournament proceeds to end after the end of 10 games. In one embodiment, the player with the highest number of credits wins the tournament. Therefore, the players are not eliminated then compete for the tournament award. In one embodiment, each of the players keep each of the credits that they won throughout the tournament.

FIGS. 7A, 7B, 7C, 7D, 7E, 7F, 7G, 7H, 7I, 7J, and 7K illustrate an embodiment of the tournament where one or more elements of the base game determine an advantage or an element of one or more player's tournament games. In the illustrated embodiment, if the player wagers more and qualifies for the tournament, the player is able to win more in the tournament because a multiplier that is applied to the tournament games is determined by the amount the player wagers in the base game. That is, the amount a player wagers in the qualifying base game determines the amount of a multiplier or modifier the player receives in the tournament that is applied to each tournament game played. In this embodiment, the gaming system provides the player an incentive to wager more in the base game to receive a better tournament element or advantage.

Figure 7A:
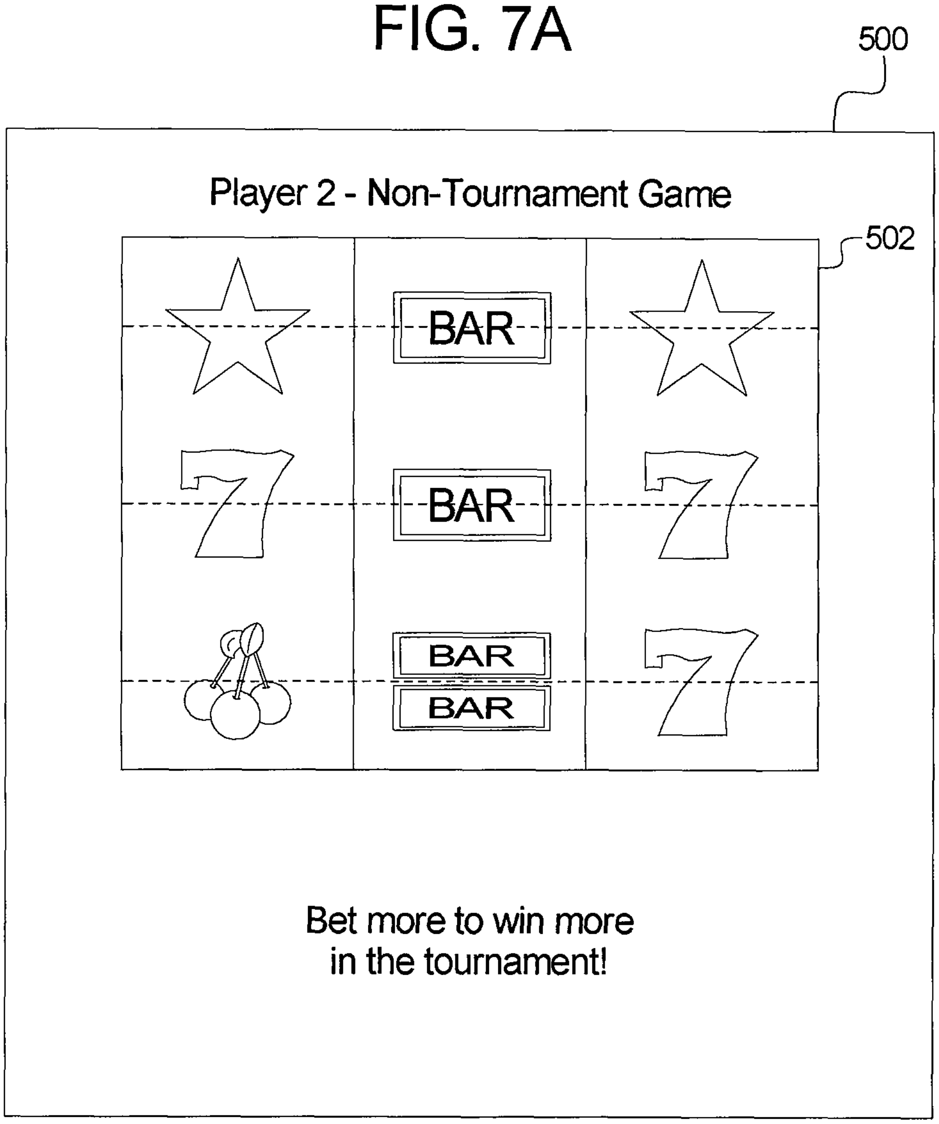

As illustrated in FIG. 7A, the gaming device informs one of the players, player 2, while they are playing a non-tournament game that if the player wagers more the player will win more in the tournament if they qualify for the tournament.

Figure 7B:
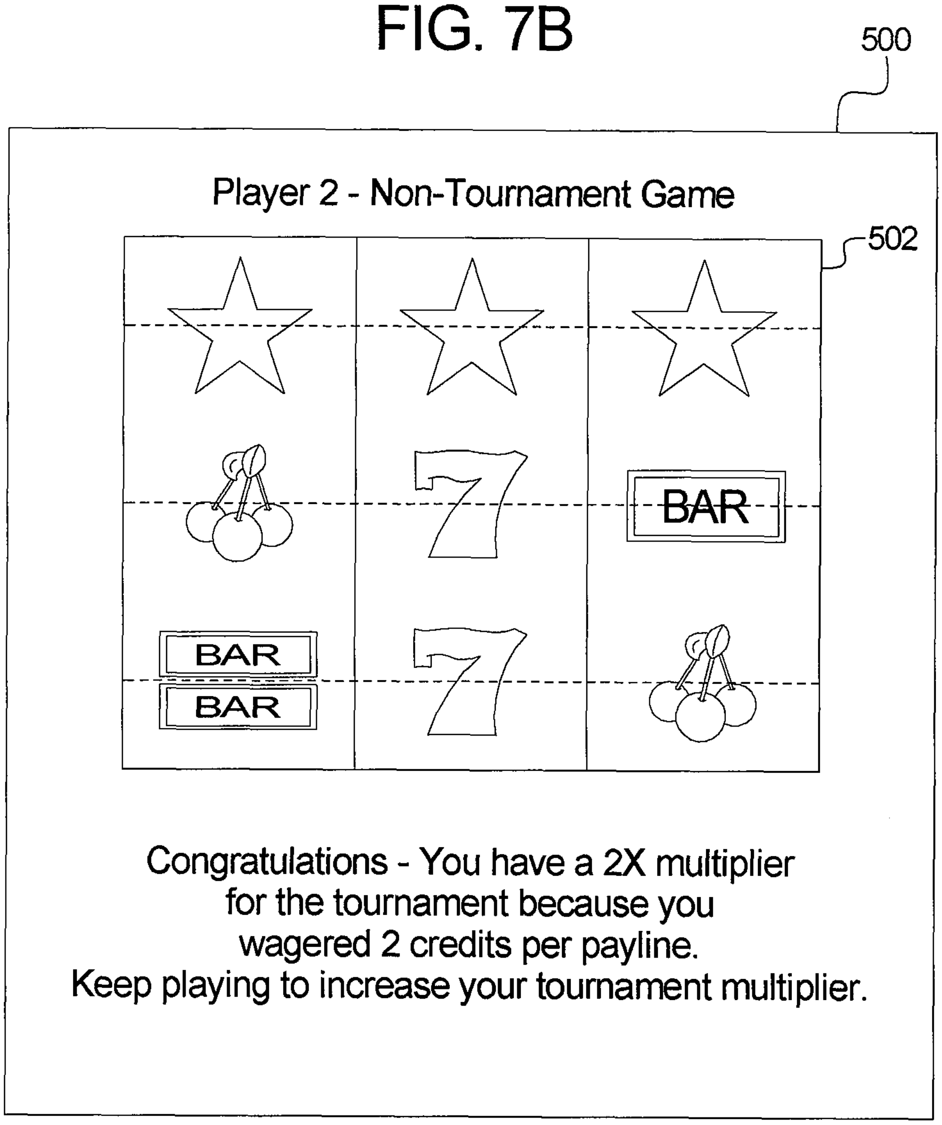

As illustrated in FIG. 7B, in one embodiment, the tournament qualifying event is a game outcome in the primary or base game. As illustrated in FIG. 7B, the player achieves the 3 stars needed to advance in the tournament, and the player wagered 2 credits per payline. Therefore in the illustrated embodiment, player 2 starts the tournament with a multiplier of 2. In this embodiment once the player qualifies for the tournament, they can keep playing the base game and keep wagering to try to achieve a higher multiplier for the tournament. In this example embodiment, each time a player receives the tournament qualifying event of a specific game outcome generated in the base game, the gaming system increases their modifier based on the amount of the wager in that qualifying base game.

Figure 7C:

As illustrated in FIG. 7C, player 2 continues playing non-tournament games until the tournament begins. The gaming system informs the player that they won the 3 stars again and now the player gets a multiplier of 4, and the tournament begins then.

FIG. 7D is a chart 504 illustrating a first column 506 that illustrates 5 players in the tournament and includes a second column 508 that illustrates the multiplier corresponding to each player for tournament play. As illustrated in FIG. 7D, player 1 has a multiplier of 1 or does not win any multiplier. Player 2 has a multiplier of 2. Player 3 has a multiplier of 4. Player 4 has a multiplier of 8, and player 5 has a multiplier of 2.

Figure 7E:
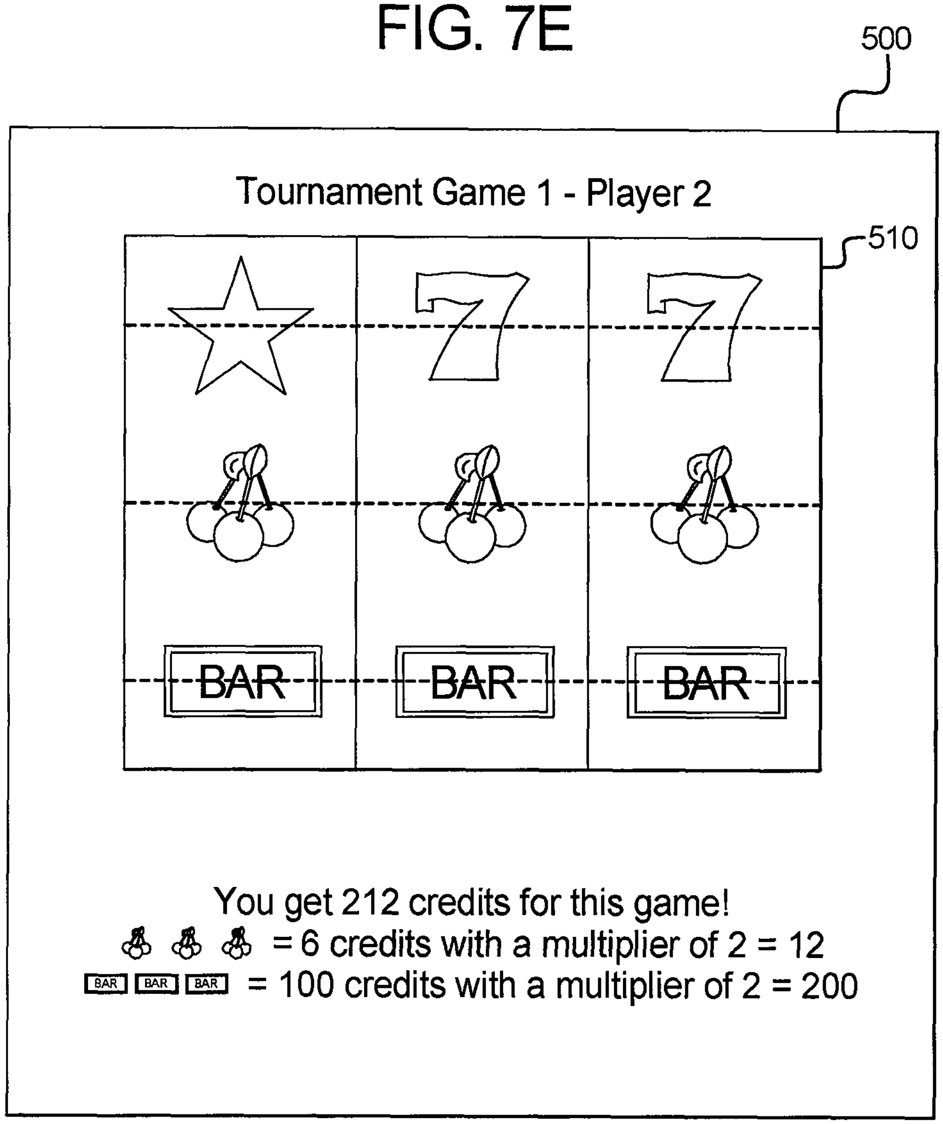

FIG. 7E illustrates tournament game 1 for player 2 who has a multiplier of 2. In tournament game 1, the display device 510 for player number 2 displays a tournament game 512. The player wins 212 credits for this tournament game. The player receives 3 cherries which is worth 6 credits in this embodiment. The player has a multiplier of 2 so the three cherries are worth 12 credits. The player wins 3 bars in the payline which equals an award of 100 credits and has a multiplier of 2 which is 200 credits.

Figure 7F:
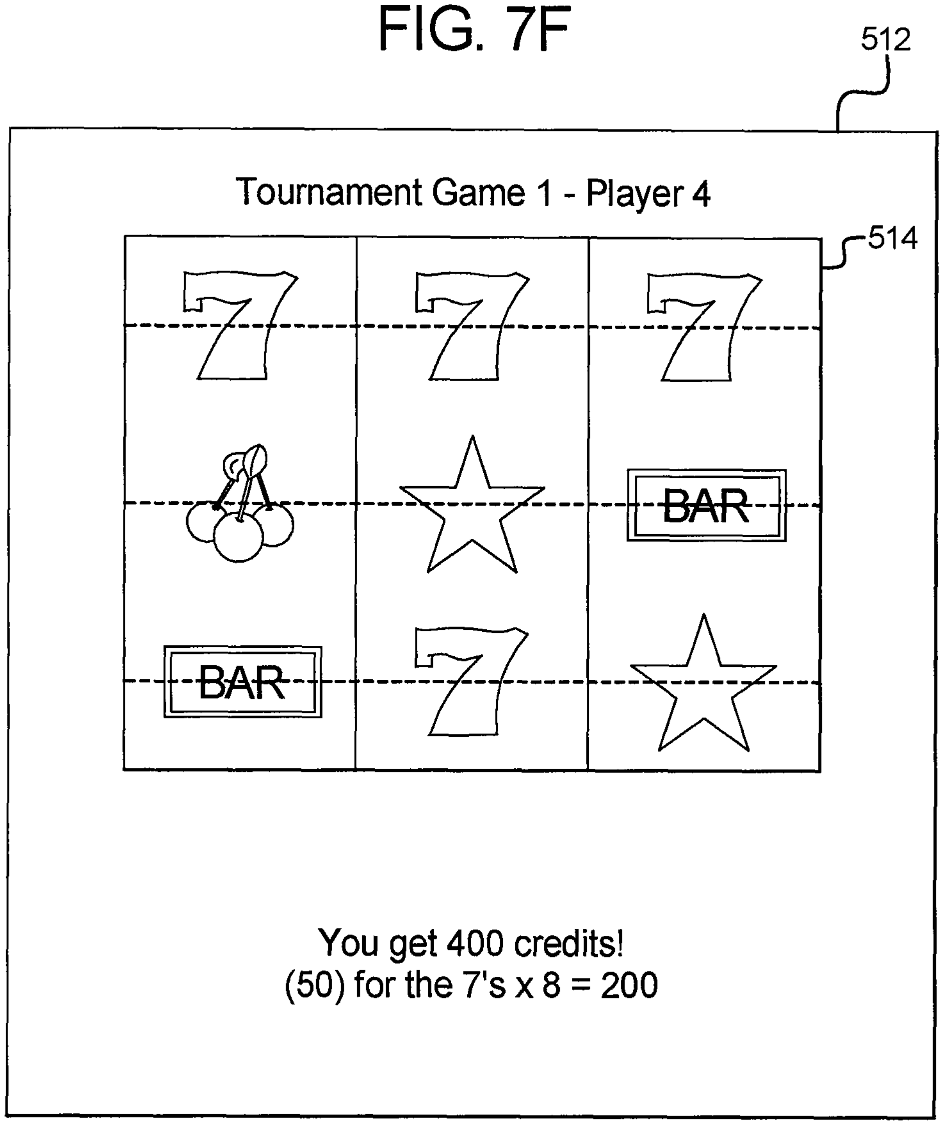

FIG. 7F illustrates tournament game 1 516 for player 4 on the display device 512 for that player's gaming device. The gaming device displays a tournament game 514 that provides for an award of 400 credits. The player achieves 3 sevens on one of the paylines which is an award of 50. The player wins 400 credits because they have a multiplier of 8.

FIG. 7G illustrates a common display device or a leader board 516 that displays the standings of the players at the end of game 5. Player 1 has 50 credits. Player 2 has 550 credits. Player 3 has 700 credits. Player 4 has 890 credits and player 5 has 300 credits. At this point in the tournament, 2 players are eliminated from the tournament. The player elimination triggering event is the end of game 5. Players 1 and 5 are both eliminated from the tournament because they have the lowest accumulated credits.

FIG. 7H is a chart 518 that displays the tournament award at the end of game 5. Players 1 and 5 are eliminated from the tournament but each played 5 games. The value of each of the unplayed games is 10 credits. Player 1 has a multiplier of 1 and player 5 has a multiplier of 2. Therefore, the amount contributed to the tournament award for the first player's unplayed games is 50 credits (5×10). The value of the unplayed games for the fifth player are 100 credits (5×10×2). Therefore, at the end of game 5, the tournament award is worth 150 credits.

FIG. 7I illustrates the leader board at game 8 which in this embodiment is a second player elimination triggering event. As illustrated in FIG. 7I, player 2 is eliminated. Player 2 has the score of 800 credits while player 3 has a score of 825 credits and player 4 has a score 1050 credits.

FIG. 7J illustrates the tournament award at the end of game 8. The tournament award at game 8 is worth 190 credits. The gaming system contributed 50 credits based on the first player's elimination as illustrated in FIG. 7H. The gaming system contributed 100 credits based on the fifth player's elimination as illustrated in FIG. 7H. The gaming system contributed of 40 credits based on the second player's elimination (2 unplayed games×10 credits per game×a multiplier of 4). In this embodiment, the last player elimination triggering event is the occurrence of game 8, therefore this is the final tournament award.

FIG. 7K illustrates a screen shot from player 4's display device at the end of the tournament at the end of game 10. The gaming device informs the player that they win the tournament. The player wins 1400 credits which are the player's credits won in the tournament and 190 credits for the tournament award. In one embodiment, the player wins credits that are won by the player in the tournament. In another embodiment the tournament credits are just used to determine which tournament player wins the tournament.

It should be appreciated that the element or advantage provided to the tournament players may be any suitable element or advantage. In one embodiment, the tournament element or advantage is a modifier, such as a multiplier. In another embodiment, the tournament element or advantage is a different number of initial tournament games. That is, different numbers of initial tournament games are provided to different players. In another embodiment, an element of the tournament game provided to multiple tournament players is different. For example, different players have different numbers of active paylines in the tournament games. In another example, different players have different paytables in the tournament games. In another example, different players have different numbers of winning symbols in the tournament. In another embodiment, different players have different probabilities of generating winning symbols or winning symbol combinations in the tournament. In another embodiment, the gaming system provides one or more players the advantage of having a head start in the object of winning the tournament. For example, in one embodiment, the gaming system provides one or more players an initial number of credits to begin the tournament with where the rest of the players begin the tournament with 0 credits. In a credit based tournament, this would provide the players that received the initial credits an advantage. In another embodiment, the gaming system provides the players with different amounts of times to play the tournament. In this embodiment of a time based tournament, certain players have more time to accrue points or credits to try to win the tournament. In another embodiment, It should be appreciated that in one embodiment, the advantage or tournament element provided to the players for the tournament causes the tournament award to be a dynamically changing award. For example, as illustrated in FIG. 7A to 7K, in one embodiment each player is assigned a multiplier and depending on which player is eliminated from the tournament and at what point the player is eliminated, the tournament award continually changes because the values of the unplayed games are different for each player. Another embodiment of a tournament element that causes a dynamically changing tournament award is different players are provided different numbers of initial tournament games. The different players may have different numbers of remaining games upon elimination. That is, when a tournament player is eliminated, which tournament player is eliminated changes the value of the tournament award. For example, player A is awarded 13 tournament games, player B is awarded 8 tournament games. At the end of 5 played games for each player, if player A is eliminated and player B is not eliminated assuming the value of unplayed tournament games is the same for each player, the elimination of player A will contribute more to the tournament award than player B. In another embodiment, the average expected payout value of the unplayed tournament games is different from one or more of the players. Therefore, which player is eliminated changes the value of the tournament award.

In certain of these embodiments where the tournament award changes, in one embodiment, the gaming system informs the players of the lowest possible tournament award that the player could win. For example, if there are 5 players and 4 have a tournament element of a 1 times multiplier and 1 player has a tournament element of a 10 times multiplier, the lowest possible tournament award occurs if the player with the 10 times multiplier wins the tournament. However, it is not possible to know the actual contribution to the tournament award until the player has actually been eliminated. Therefore, the size of the tournament award is unknown until the end of the tournament.

It should be appreciated that the advantage or element of the tournament may be determined in any suitable manner. In one embodiment, the advantage or element for each player is determined by a number of points won in the base game. For example, once a player qualifies for the tournament, the player receives points upon certain events occurring in the base game. For example, every time the player achieves a designated symbol combination, the gaming system provides the player a designated number of points. The number of points then determines which advantage or element the player will receive in the tournament. For example, every 25 points the player receives, the player receives an addition of 1 to their multiplier. In one such embodiment, when the player has uneven points to obtain the advantage or element, those points are saved for the player for a later tournament.

In another embodiment, ranges in point values determine the advantage or element for each player. For example, if a player has 0 to 75 points, the player receives multiplier of 2 in the tournament. If the player has 76 to 125 points, the player receives a multiplier of 3 in the tournament. If the player has 126 to 150 points, the player receives a multiplier of 5 in the tournament.

In one such embodiment, qualification is based on achieving the initial point range to enter the tournament and points acquired after that can be used to achieve a better advantage in the tournament. In one such embodiment, the player may save points and use them for a later tournament. For example, if a player has 0 to 50 points, the player may enter the tournament with a multiplier of 1. If the player has an additional 25 points or a total of 75 points, the player may decide to use the points to obtain a multiplier of 2 for the tournament or hold the points over for qualification or achieving a higher advantage in a next tournament. In one such embodiment, the tournament runs in time intervals therefore, the timing of entering the tournament and which advantage the player receives is strategic on the part of the player to win the tournament or have better luck in a future tournament.

In another embodiment, qualification is based on achieving the initial point range to enter the tournament and points acquired after that can be used to achieve a better advantage in the tournament, however, after a certain interval of time the points reset. For example, if a player has 0 to 50 points, the player may enter the tournament with a multiplier of 1. If the player has an additional 25 points or a total of 75 points, the player may decide to use the points to obtain a multiplier of 2 for the tournament or hold the points over for qualification or achieving a higher advantage in a next tournament. However, every hour the points reset, so if the player chooses to save the player's points and another tournament does not begin or the player does not select to enter a tournament in that time period, the player loses those points and starts over collecting points for the tournament.

In one embodiment, whether a player wins an advantage or element for the tournament is determined by an event in the base game. However, the advantage or element for each qualified player is randomly determined. For example, if the gaming device generates a designated symbol in the base game, the player qualifies for a number of extra tournament games. However, the number of extra tournament games provided to each qualified player is randomly determined by the gaming system.

These advantages or elements for each player may be determined by a combination of factors in the base game or by a single factor of the base game.

It should be appreciated that the player elimination triggering event may be based on any suitable criterion including but not limited to: (a) time in a time based tournament; (b) number of games played in a number of games based tournament; (c) total amount wagered in a gaming session in a live money tournament; (d) a player ranking, (e) a designated number of players falling below a designated threshold in points or credits, (f) a designated number of players winning a designated threshold in points or credits, (g) a designated number of generations of one or more designated tournament game outcomes; (h) any other player card statistic and (i) any suitable combination of criterion. In one embodiment, the gaming system eliminates players on regular intervals such as 5 spins, 10 spins, 15 spins and 20 spins of the tournament. In another embodiment, the player elimination triggering event is time based. For example, the gaming system eliminates players at 5 minutes, 10 minutes and 20 minutes. In another embodiment, the elimination is based on a highest score, a lowest score or a designated score. For example, when a player reaches a score of 250 in the tournament the gaming system eliminates one or more players.

It should be appreciated that a single tournament may include multiple different player elimination triggering events. For example, in a tournament, a designated number of games played is a first player elimination triggering event and a number of credits won is a second player elimination triggering event for a single tournament.

It should be appreciated that the number of players to eliminate upon the occurrence of a player elimination triggering event may be determined in any suitable manner and may effect the tournament award in any suitable manner. In one embodiment, there is a minimum number of players that the gaming system does not eliminate during the tournament until the end of the tournament. For example, the gaming system always keeps two players playing in the tournament. In another embodiment, the gaming system determines which players to eliminate based on a player elimination threshold. For example, all players that have below 75 credits are eliminated upon an occurrence of a first player elimination triggering event. All players that have below 150 credits are eliminated upon an occurrence of a second player elimination triggering event.

It should be appreciated that the number of players that are eliminated in each elimination may be determined in any suitable manner. In one embodiment, the elimination is a predetermined percentage of the number of players that are in the tournament. For example, ¼ of the current tournament players are eliminated in 2 player elimination events in a tournament. In another example, ¼ of the current tournament players are eliminated upon an occurrence of a first player elimination triggering event and ½ of the current tournament players are eliminated upon the occurrence of a second player elimination triggering event.

In another embodiment, how many players are eliminated is based on the exact number of players in the tournament. For example, different numbers of players are eliminated if there are 4 tournament players than if there are 20 tournament players.

Different equations may be used at different points in the tournament to determine different numbers of players to eliminate upon occurrence of player elimination triggering events. In one specific embodiment of a 20 tournament game tournament, if there are more than 4 players initially playing the tournament (total number of players=n), after an occurrence of a first player elimination triggering event, such as the play of five tournament games, a number of players equal to (n/4) are eliminated. In one embodiment, upon an occurrence of a second player elimination triggering event, such as 10 played tournament games, with the current total number of players=n, the number of players eliminated is (n/4) (rounded to the nearest integer) subtracted from n, then divided by 4, with that final value rounded to the highest integer. In one embodiment, after an occurrence of a third player elimination triggering event, all players except the two players that accumulate the most credits are eliminated. At the end of 20 tournament games, the gaming system determines the winner and provide the tournament award value that includes all of expected values of the eliminated player's unplayed tournament games to a tournament winner.

In one embodiment, if there are only 2 players, there is a single elimination at an end of one of the tournament games. In one embodiment, if there are 20 tournament games, the elimination is at the end of the fifteenth tournament game. After the 15 tournament games, the winner is then awarded 5 additional tournament games and is awarded the tournament award includes the average expected payout values of the unplayed provided tournament games.

In one embodiment, if there are 3 players, the gaming system eliminates one of the players upon an occurrence of a first player elimination triggering event. In one embodiment, if there are 20 games the player is eliminated at the end of the tenth tournament game and the winner is awarded the tournament award which includes the average expected payout value of the eliminated player's tournament games.

In one embodiment, if there are only 4 players, a single player is eliminated at one point in the tournament and another single player is eliminated at another point in the tournament. For example, in a tournament of 20 tournament games, a first player is eliminated after the tenth tournament game, and a second player is eliminated after the fifteenth tournament game. The winner is determined at the end of the twentieth tournament game and this tournament winner is awarded a tournament award that includes the average expected payout values of the unplayed tournament games.

In one embodiment, the tournament always includes at least two players who are eligible to play the tournament and choose to play the tournament. In one embodiment, the gaming system enables the players to play one of a plurality of different base games. At the beginning of the gaming session, the gaming system enables the players to access points or credits or other redeemable winnings won in other base games by logging onto the gaming machine. During the base game play, the gaming system also accumulates chips, points or credits won associated with the base game for the player. In one such embodiment, the gaming system provides the player chips, points or credits upon the occurrence of a designated symbol combination generated during play of the base game. In one embodiment, the tournament occurs during certain time intervals. When the message is sent to each eligible gaming machine that the tournament is to begin, the gaming machine verifies that the player has accumulated the required amount of chips, points, or credits to purchase an advantage, such as a multiplier to play the tournament. If the player has the required amount of chips, points or credits, an indication is made by the gaming machine, such as the ringing of a bell. The gaming machine displays a screen to the player that enables the player to purchase one of a plurality of different advantages using the accumulated chips, points or credits. For example, the gaming system enables the player to purchase a multiplier integer between and including 1 to 10 based on the accumulated amount of chips, points or credits. The gaming system enables the player to make a decision to opt out of the tournament and not play or purchase a multiplier. In one embodiment, if the player fails to make a selection, the gaming device opts out the player on the player's behalf. In one embodiment, the gaming system provides all of the eligible players a limited amount of time to purchase the advantage to enter the tournament and if the players does not enter the tournament, the players have to wait for a next tournament to being.

Once the tournament begins, such as at the expiration of the time period, the gaming system enables the players to play the tournament games. In one embodiment, the gaming system provides each player a same number of free initial tournament games. The advantage purchased by the player is applied to all of the games of the tournament. For example, the multiplier purchased by the player is applied to each of the wins of the tournament games. Upon the occurrence of a player elimination triggering event, such as a number of played games, the gaming system eliminates players from the tournament.

In one embodiment, the eliminations are based on cumulative credits earned during the tournament games and the players with the least amount of credits are eliminated from the tournament. For example, if the players are each provided 20 tournament games, at 15 tournament games remaining, 25% of the players with the least amount of cumulative credits are eliminated from the tournament. When 10 tournament games remaining, 25% of the players with the least amount of cumulative credits are eliminated from the tournament. The average expected payout value of each of the eliminated players' tournament games modified by their purchased advantage is allocated to the tournament award. For example, if a player is eliminated at the end of the fifth tournament game and each tournament game is worth 100 credits and the player has a 3× multiplier then 4500 (15×100×3) credits are allocated to the tournament award for that eliminated player. In one embodiment, when 15 of the tournament games have been played, the number of the players eliminated is based on the number of tournament winners.

The tournament award is continuously calculated throughout the tournament whenever a player elimination triggering event occurs. In one embodiment, for every ten players in the tournament, a player is awarded a portion of the tournament award. For example, if there are 8 players in the tournament, there is only one tournament winner that wins 100% of the tournament award. If there are 19 players in the tournament, the tournament has two tournament winners that split the tournament award. For example, if there are two tournament winners the tournament award is split 70% and 30%. If there are 20 tournament players, the tournament has three tournament winners. For example, the tournament award is split 50%, 30% and 20%. It should be appreciated that the tournament can have any suitable number of tournament winners and that the tournament award can be split in any suitable manner.

It should be appreciated that if at upon an occurrence of a player elimination triggering event one or more players has a same credit value or same point value or any other same value that the elimination is based on, the gaming system may determine which player to eliminate in any suitable manner. In one embodiment, the gaming system randomly determines which of the tied players to eliminate. In another embodiment, all tied players are eliminated. In another embodiment, none of the tied players are eliminated. In one embodiment, the gaming system provides a tie breaker. In one embodiment, the player is given the tie breaker of selecting a number between 0 and 9. In one such embodiment, the player with the highest number is eliminated. In another embodiment, the player with the lowest number is eliminated. In an embodiment where the gaming system provides different advantages or elements of the player's tournament games, that advantage or element helps to determine the tie breaker between the players. For example, in the tie breaker, each player is given a random number between 0 and 9 and that number is multiplied by that player's multiplier. In one embodiment, the gaming system eliminates the player with has the lowest number.

It is possible that multiple players may have a tie. In one embodiment, each player is randomly assigned a number and the players with the 2 lowest numbers are eliminated. In one embodiment, the players are eliminated from the lowest number to the largest number. In another embodiment the gaming system randomly provides the player a number which is multiplied by the multiplier, and then players are eliminated from the lowest to the largest number. These processes may repeat themselves until the ties are over.

It should be appreciated that the determination of which players to eliminate may be determined in any suitable manner. In one embodiment, which players are eliminated is based on the number of credits accumulated by that player in the tournament. A designated number of players with the least amount of credits are eliminated at each elimination. In another embodiment the players receive points, and the players with the lowest number of points are eliminated.

It should also be appreciated that the gaming system enables the tournament to be based on criteria other than most accumulated points or credits. In one such embodiment, the gaming system determines a tournament score or standing for each participating player based on occurrences of a designated event during the tournament. The tournament scoring in one embodiment is completely based on one or more designated outcomes or events. For example, the player with the most occurrences of scatter pays wins the tournament. It should be appreciated that the tournament score may be based on any suitable event or combination of events. In one embodiment, the player with most occurrences of a single symbol wins the tournament. For example, the gaming system determines the winner of the tournament based on which player has generated the most wild symbols during play of the tournament. In another embodiment, the player with the most occurrences of one or more designated groups of symbols wins the tournament. For example, the gaming system scores the tournament based on which player generated the most flushes in a video poker tournament. In another embodiment, the designated event or outcome is generating a symbol in a specific location. For example, the gaming system scores the tournament based on the cherry symbols in the first column or on the first reel. That is, whichever player generates the most cherry symbols in the first column of the gaming device is the winner of the tournament. In another embodiment, the winner of the tournament is based on the greatest number of total winning combinations. In another embodiment, the winner of the tournament is based on the most occurrences of winning outcomes in a row. In another embodiment, the winner of the tournament is based on the most occurrences of losing outcomes in a row. In another embodiment, the winner of the tournament is based on the highest single payout of the players. In another embodiment, the winner of the tournament is based on the highest average payout of the players. It should be appreciated that the designated outcome or event may be any suitable outcome or event. In another embodiment, the tournament is based on the least occurrences of a designated outcome or event. For example, the tournament winner is the player who generated the fewest blank symbols in the slot tournament. It should be appreciated that the designated award or event may be any suitable event, including but not limited to: (a) a game outcome; (b) a point total; (c) a credit total; (d) a bonus event; (e) a game event; or (f) any combination thereof.

In one embodiment, one or more of the tournament awards are each funded via a side bet or side wager. In this embodiment, a player must place or wager a side bet to be eligible to qualify to enter the tournament. For example, the player must place a twenty-five credit side bet during each play of the base game to become eligible to qualify for the tournament during that play of the base game. In one such embodiment, the player is also required to place a certain level of wager, such as a maximum wager, to be eligible for the tournament. That is, in one embodiment, the player must place the maximum bet and the side bet to qualify to enter the tournament. In one such embodiment, the gaming system provides a single player input to enable the player to place the required side bet and wager at the same time so the player has to make only one input to enter a tournament eligible wager.

In one such embodiment, these side wagers create a pool for the tournament. In one embodiment, the amount in the pool determines a number of free tournament games that will be provided during the tournament. For example, if the average expected payout value of each tournament game is $1 and the award pool is $100, the tournament will include 100 tournament games to be distributed to the players during the tournament. If 5 players play the tournament, each player is initially provided 20 free tournament games. Each of the players play the first 10 games without an elimination. The player elimination triggering event is 10 games played by each player, after the end of these 10 games, 2 of the players are eliminated. Therefore, the average expected payout value of each of the eliminated players' tournament games is $1. For each player, $10 is contributed to the tournament award for each eliminated player. Therefore, $20 (10 games per player×2 players×$1 per game) is allocated to the tournament award from the award pool of $100. After the play of 5 more games by each player, the gaming device eliminates another player. Therefore, the average expected payout value of the eliminated player's tournament games is $5. Therefore, $5 is allocated to the tournament award from the award pool. Thus, in one embodiment, this award pool also funds the tournament award. In one embodiment, players win the amount of credits they win in the tournament games. In one such embodiment, the amount won by the players in the games played in the tournament is funded by the award pool.

It should be appreciated in different embodiments, the tournament award is not predictable and changes based on the factors of the tournament. For example, three players are eliminated after the first minute of the tournament. How much the gaming system allocates to the tournament award is based on how many unplayed games the three players had. In another example, after an occurrence of a player elimination triggering event, such as a first player accumulating 100 points in the tournament, the gaming system determines a number of players to eliminate randomly or based on a formula. The number of players eliminated and how many remaining tournament games those players changes the allocation to the tournament award. Therefore, in one embodiment, side wagers placed by players trying to win an entry into the tournament fund an award pool that funds the tournament. In one embodiment, the tournament is triggered when the award pool reaches a designated amount. For example, when the award pool reaches $500 the tournament begins or a participation period to begin the tournament begins.

In another embodiment, if the player places or wagers the required side bet, the player may wager at any credit amount during the primary game (i.e., the player need not place the maximum bet and the side bet to be eligible to qualify to enter the tournament). In one such embodiment, the greater the player's wager (in addition to the placed side bet), the greater the odds or probability that the player will qualify to enter the tournament. It should be appreciated that one or more of the tournament awards may each be funded, at least in part, based on the wagers placed on the primary games of the gaming devices in the gaming system, via a gaming establishment or via any suitable manner.

In another embodiment, one or more of the tournament awards are partially funded via a side bet or side wager which the player may make (and which may be tracked via a side bet meter). In one embodiment, one or more of the tournament awards are funded with only side bets or side wagers placed. For example, the tournament award provided at the end of the tournament includes the average expected payout values of the unplayed but provided tournament games and an intermittent award is funded by side wagers. In another embodiment, one or more of the tournament awards are funded based on player's wagers as well as any side bets or side wagers placed.

It should be appreciated that the tournament award may include an initial award amount at the beginning of the tournament and that the average expected payout values of the unplayed tournament games are added to that initial fund. For example, the initial tournament award is $100. Upon a player elimination event, the average expected payout value of the unplayed and provided tournament games of the eliminated players is $25. The tournament award is then $125.

It should be appreciated that in various different embodiments the tournament award changes dynamically based on suitable tournament events, characteristics or advantages. In one embodiment, how many players are eliminated upon the occurrence of a player elimination triggering event changes the value of the tournament award. For example, if three players are eliminated upon an occurrence of a player elimination triggering event and the average expected payout value of each game is $1 and each of the players has 10 games remaining, $30 is allocated towards the tournament award. However, if twenty players are eliminated upon an occurrence of a player elimination triggering event and the average expected payout value of each game is $1 and each of the players has 10 games remaining, the gaming system allocates $200 towards the tournament award.

The present disclosure contemplates that another way the tournament award dynamically changes is when or at what time one or more player elimination triggering events occur. For example, if a player elimination triggering event occurs which causes the elimination of five players who each have 18 games remaining and the average expected payout value of each game is $2, the gaming system allocates $180 towards the tournament award. However, if a player elimination triggering event occurs which causes the elimination of five players who each have 3 games remaining and the average expected payout value of each game is $2, the gaming system allocates $30 towards the tournament award.

In one embodiment, the advantage of the eliminated players causes the tournament award to be dynamic. For example, if a player elimination triggering event occurs which causes the elimination of two players who each have 10 games remaining and the average expected payout value of each game is $2, and one of the players has a multiplier of 10 and one of the players has a multiplier of 8. The gaming system allocates $380 towards the tournament award. However, if a player elimination triggering event occurs later in the tournament which causes the elimination of five players who each have 3 games remaining and the average expected payout value of each game is $2 and four of the five players have a multiplier of 1 and one of the players has a multiplier of 2, the gaming system allocates $36 towards the tournament award.

In one embodiment, a minimum wager level is required for a gaming device to qualify to be selected to obtain entry into the tournament. In one embodiment, this minimum wager level is the maximum wager level for the primary game in the gaming device. In another embodiment, no minimum wager level is required for a gaming device to qualify to be selected to obtain entry into the tournament.

In one embodiment, the base games that qualify players for tournament play do not include bonus game triggers. In one embodiment, the fund that is normally allocated to the bonus games funds the tournament. In one such embodiment, the base games that qualify players for tournament play do not include one or more certain types of bonus triggers, such as one or more free spins triggers. In this embodiment, the fund that is normally allocated to the free spins funds the tournament.

It should be appreciated that the tournament game and any information related to the tournament may be displayed to players in any suitable manner. In one embodiment, the tournament game is a game that is presented instead of base games. That is, the gaming system only enables the player to play tournament games at one time and base games at another time (such as before and after the tournament). In another embodiment, the tournament games are provided to the players in a service window. In one such embodiment, the gaming system enables the players to continue playing base games simultaneously while they are playing tournament games.

In one embodiment, the gaming system continually updates the standings of the players. At the end of each tournament game, each gaming device sends a result of that tournament game for that player to a server which then causes the display of the results to all the other players. In one embodiment, there are standings on a common display device such as a leader board that is updated every tournament game. In one embodiment, the tournament award is continually updated and also displayed to one or more players. In one embodiment, how many tournament games each player has left is communicated to other players. For example, players may play the tournament games at different speeds and the gaming system informs players how many tournament games each players has left. In another example, the gaming system provides the players different numbers of tournament games and the gaming system informs other players how many tournament games the players have played or have remaining. It should be appreciated that any information about the tournament may be provided to each of the tournament players in any suitable manner including visually on a common display and/or displayed and/or orally provided individually at the gaming devices. It should be appreciated that any information about the tournament may be provided to any non-tournament players in any suitable manner.

In one embodiment, an award for a tournament is a game function or enhancement that may be saved and used in non-tournament games that is based on the amount of credits associated with the average expected payout values of the provided unplayed tournament games. For example, the players may win a multiplier to apply to a designated number of non-tournament games. It should be appreciated that the gaming system may provide any tournament player an award of a non-tournament game function. In one embodiment, the gaming system requires the player to immediately use the game function after the tournament. In another embodiment, the game function is stored in the gaming system or in a player account. The player may make an input to use or apply the game function at a later date for any suitable non-tournament game. In another embodiment, the gaming system requires the player to use the game function at a later date, requiring a return visit from the player. In another embodiment, the gaming system requires the player to use the game function on a certain date, requiring a return visit from the player. For example, the gaming system provides the player 10 tournament games that must be redeemed the day after winning the tournament games.

It should be appreciated that the tournament may have any suitable numbers of tournament winners. In one embodiment, the tournament award is provided to a single tournament player. In another embodiment, the tournament award is split equally among multiple tournament players. In another embodiment, the tournament award is split unequally among multiple tournament players based on any suitable factor, such as credits won in the tournament or points won in the tournament.

In one embodiment, the tournament includes a plurality of rounds and each round includes prizes for the players. That is, an award or a prize is awarded to other players in addition to the overall tournament winner. In another embodiment, the gaming system provides a prize for each round winner. In another embodiment, the player with the lowest score receives a prize, such as an entry into another tournament.

It should be appreciated that intermittent or intermediate awards in a tournament may be determined based on any suitable tournament or game parameters or criteria which can be measured by the server based system. In one embodiment, one or more intermittent awards are based on designated symbol occurrences on a designated payline. In another embodiment, the player with the first occurrence of a designated event wins a prize. For example, the first player who achieves a royal flush in a video poker tournament wins an award or prize. The gaming system may provide any suitable number of players awards or prizes based on any suitable criteria. It should be appreciated that the designated award or event may be any suitable event, including but not limited to: (a) a game outcome; (b) a point total; (c) a credit total; (d) a bonus event; (e) a game event; or (f) any combination thereof.

In one embodiment, the tournament provides intermittent awards to the players based on the average expected payout values of unplayed games of eliminated players. In one such embodiment, instead of or in addition to providing a tournament award at the end of the tournament, the gaming system provides intermittent awards. For example, at the end of a first elimination, the gaming system provides a player (such as the player with the most credits) an award equal to 30% of the current tournament award. At the end of the second elimination, the gaming system provides a player (such as the player with the most credits) an award equal to 50% of the current tournament award. At an end of the tournament, the gaming system provides the tournament winner the remaining tournament award.

It should be appreciated that the tournament may include any suitable number of rounds. It should also be appreciated that the tournament may be played on gaming devices in one establishment or on gaming devices in a plurality of gaming establishments.

It should be appreciated that the tournament game may be any suitable game. In one embodiment, the tournament game is the same for each of a plurality of players. In another embodiment the tournament games provided to players are different types of games. For example, the tournament games provided to each player may be 5 poker games and 5 blackjack games. In one embodiment, the tournament game is the same as the base game but has an added element. For example, the base game is a slot game. The tournament game is the slot game but has one or more designated or extra symbols that cause an award of different numbers credit to the players. In one embodiment, the gaming system determines the credits to award based on the occurrence of the extra symbol randomly. In one embodiment, the gaming system determines the credit based on the occurrence of the extra symbol from a weighted table. In one embodiment, these extra credits provided for the generation of one or more extra symbols are changed by an applicable advantage or element provided in the tournament. For example, these extra credits provided for the generation of one or more designated symbols are multiplied by any provided multipliers in the game. In certain embodiments, the different types of games level the playing field of other base games. In one embodiment, the tournament includes different tournament games that have different average payback percentages. Therefore, as different players are eliminated different amounts are contributed to the tournament award based on which games the eliminated players are playing. A player playing a game with a lower payback percentage can then win the tournament award which is determined on eliminated players whose unplayed tournament games contributed a higher percentage to the tournament award, leveling the playing field of the players.

It should be appreciated that the tournament triggering event may be any suitable event. In one embodiment, the triggering event is a passage of time. For example, at the end of the time period, such as every 5 minutes, the gaming system provides a tournament to all qualified players. In another embodiment, the triggering event is a game outcome generated in a designated time period. In another embodiment, the triggering event is an operator input. In another embodiment, the triggering event is a number of game outcomes, such as a certain number of consecutive winning game outcomes. In another embodiment, the tournament triggering event is a point total. In another embodiment, the triggering event is an accumulating event. In another embodiment the tournament event is a collected number of designated game outcomes. For example, when qualified players collectively achieve 5 of the designated game outcomes the tournament begins. In another embodiment the tournament triggering event is a single outcome generated in a designated time period. In another embodiment, the tournament triggering event is a point total won by qualified players. In another embodiment, the tournament triggering event is a designated number of players being eligible for the tournament. For example when 50 players are eligible to play the tournament, the tournament begins. In one embodiment, side wagers placed by players trying to win an entry into the tournament fund an award pool that funds the tournament. In one embodiment, the tournament is triggered when the award pool reaches a designated amount.

It should be appreciated that any suitable qualifier or qualification or combination of qualifications may be employed to determine eligibility for tournament play. In one embodiment, a method or characteristic of a player's base game qualifies the player for tournament entry.

In one embodiment, the tournament qualification event is achieving a certain symbol combination in a play of a base game. In another embodiment, the tournament qualification event is achieving a plurality certain symbol combinations in a play of a base game during uninterrupted play. In another embodiment, the tournament qualification event is achieving a plurality certain symbol combinations in a play of a base game in a certain number of games or over a certain period of time. In another embodiment, the tournament qualification event is winning a certain number of points from a base game to qualify for the tournament.

In certain embodiments, entry into the tournament is free and the games that are provided to the players during the tournament are each free games. In certain other embodiments, entry into the tournament is free but the gaming system requires payment or a wager for the play of each game during the tournament. In one embodiment, the gaming system requires the player to pay for one or more of the tournament games. For example, if the player must pay $10 to play 10 tournament games. In one embodiment, the player is required to pay for the entire tournament before the start of the tournament. In another embodiment, the gaming system requires the player to wager on one or more of the tournament games. For example, the player must wager on every provided tournament game and the wager amount is used to determine any award provided by that tournament game. In certain embodiments, the gaming system requires a player to pay an entry free to participate in the tournament. In these embodiments, the entry fee and/or the wager to play each game is taken into account in the average expected payout values of the tournament games.

In one embodiment, the tournament qualifying event is based on amount the player wagers. The wager qualification may be measured in any suitable manner. In certain types of tournaments, the wager qualification is determined by the amount a player wagers such as a player's coin-in or wagers in on a single gaming device during uninterrupted game play. In another embodiment, the wager qualification amount is determined by the amount the player wagers at any linked gaming device in an allotted period of time such as 24 hours. In another embodiment, the wager qualification amount is determined by the amount wagered on designated gaming devices or in particular gaming establishments. In another embodiment, the tournament qualifier is based from the average wager per spin of the reels or play of the game. In another embodiment, the amount a player wins determines whether the player qualifies for the tournament entry. The qualification win amount may be measured in any suitable manner. In one type of tournament, the qualification win amount is determined by the amount a player wins on a single gaming device during uninterrupted game play. In another embodiment, the qualification win amount is determined by the amount a player wins in an allotted time period. In another embodiment, the qualification win amount is determined by the amount the player wins at a certain type of game for a certain amount of time, such as the amount in a poker game over one week.

In one embodiment, the tournament qualifying event is based on the total amount lost by a player over a certain time. In one embodiment, losing a designated amount qualifies the player for tournament entry. In another embodiment, losing a certain number of spins or games in a row qualifies the player for tournament entry. This type of tournament creates losers tournament and provides players incentives to continue playing after hitting a period of bad luck. In one embodiment, in various types of tournaments a game outcome qualifies the player for tournament entry. For example in one embodiment, achieving a certain game score qualifies the player for tournament entry. In another embodiment, playing a game for certain amount of time qualifies the player for tournament entry. In another embodiment, the gaming system provides the player a tournament entry as a bonus award. In another embodiment, a player may win a tournament entry in a bonus game. That is, a player wins tournament qualification based on the outcome of a triggered bonus or secondary game. In another embodiment, the gaming system provides a player a tournament entry fee as an award in a primary or bonus game. That is, a player may win an entry fee into the tournament as an award in a game. In one such embodiment, the entry fee award is only available to players that have previously qualified for a tournament. In another embodiment, a player may win the tournament entry fee when they are not qualified for a tournament but may then have to win a tournament qualification or play of tournament not requiring tournament qualification to play the tournament.

In one embodiment, the tournament qualifying event is achieving on a score or win in a previous tournament. That is, a player may win an entry into a tournament from a previous tournament play.

In one embodiment, the tournament qualification event is determined based on one or more elements from a player tracking system or account. For example, all players of a certain rank or level may qualify for tournament entry. In another embodiment, all new members to a player tracking system or gaming establishment receive an automatic tournament entry. In another embodiment, upon a player's birthday the gaming system provides the player a tournament entry. In one embodiment, a player tracking system includes point intervals in each type of player which is a point interval the player received in entering into a tournament.

In one embodiment, a tournament qualification event is triggered based on one or more game play events, such as a symbol-driven trigger. In other embodiments, the tournament qualification triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device a tournament entry. In one such embodiment, the gaming device does not provide any apparent reasons to the player for winning a tournament entry, wherein qualifying for the tournament is not triggered by an event in or based specifically on any of the plays of any primary game. That is, a player is provided a tournament entry without any explanation or alternatively with simple explanations. In another embodiment, a player is provided a tournament entry at least partially based on a game triggered or symbol triggered event, such as at least partially based on the play of a primary game.

In another embodiment, the tournament qualification event is based on a point system. In one such embodiment, the gaming system provides the players points based on one or more events in the base game. For example, the gaming system provides a first point amount to a player for a first combination generated on an active payline and a second point amount to the player for the second combination on the active payline. The player then may use the qualification points for tournament entry. For example, if 50 points are required for tournament entry and the player has 65 points, the player may use 50 of those points for the tournament. In one embodiment, the player then holds the other 15 points to use in an advantage of the tournament or to purchase another tournament entry. In another embodiment, the player only has a limited time to use the points. In another embodiment, the player may accumulate points until the player chooses to use them.

In another embodiment, the gaming system or establishment provides the players chips that are won through base games. In different embodiments, the gaming system enables the players to use the chips to be eligible for bonus games, to play free games or to use to enter the tournament. Therefore, the gaming system enables the player to make decisions on how to use the multi-use chips to try to obtain the most credits.

In one embodiment of the tournament, at the end of the tournament, the tournament winner plays a game that determines the value of the tournament award. In one such embodiment, the average expected payout values of each unplayed and provided game values are allocated towards a pool for the tournament award. The gaming system then provides the tournament winner a game that determines the value of the tournament award provided to the player. For example, the average expected payout values of each unplayed and provided game values are allocated towards a pool for the tournament award pool, with a value of $175. The gaming system then provides the tournament winner a game with three masked selections. The first masked selection is associated with a value of $175. The second masked selection is associated with a value of $155. The third masked selection is associated with a value of $100. The tournament winner selects one of the selections and the selection determines the value of the tournament award provided to the player. It should be appreciated that the game provided to the tournament winner may be any suitable game including but not limited to selection games, video poker games, video blackjack games, video keno and video bingo games.

It should be appreciated that any suitable element of any of the examples disclosed herein may be combined. It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of operating a tournament gaming system, said method comprising:

providing a first tournament and a second tournament, wherein values of tournament awards for the first tournament, the second tournament being different and providing each of said first tournament and said second tournament includes:

(a) for each of a plurality of gaming machines, causing said gaming machine to:

(i) determine a designated quantity of tournament games available to be subsequently played by a player of said gaming machine in said tournament, and (ii) for each of said tournament games played, generate and display a tournament game outcome;

(b) tracking tournament game play of each player;

(c) when a player elimination triggering event occurs, eliminating a designated number of players from the tournament, said designated number being at least one and less than all of the players in said tournament;

(d) after said player elimination triggering event occurs, for each eliminated player, determining any unplayed tournament games said eliminated player has remaining when eliminated;

(e) determining a tournament winner from the plurality of players based on the tracked tournament game play;

(f) determining a value of the tournament award based, at least in part, on an average expected payout value of each of said determined unplayed tournament games; and (g) notifying said tournament winner that said tournament winner wins the tournament award.

2. The method of claim 1, which includes basing at least one element of at least one player's tournament on an amount wagered in a qualifying base game.

3. The method of claim 1, wherein providing each of said first tournament and said second tournament includes determining an advantage from a plurality of different advantages for each of a plurality of the players and providing said determined advantage in said play of the tournament, the average expected payout value of each said determined remaining unplayed tournament game being modified by any advantage of the eliminated player provided said unplayed tournament game.

4. The method of claim 3, which includes for each of said players, applying said advantage to each tournament game played by said player.

5. A method of operating a tournament gaming system, said method comprising:

(a) for each of a plurality of gaming machines, causing said gaming machine to:

(i) determine a designated quantity of tournament games available to be subsequently played by a player of said gaming machine in a tournament, and (ii) for each of said tournament games played, generate and display a tournament game outcome;

(b) tracking tournament game play of each player;

(c) when a player elimination triggering event occurs, eliminating a designated number of players from the tournament, said designated number being at least one and less than all of the players in said tournament;

(d) after said player elimination triggering event occurs, determining any unplayed tournament games each eliminated player has remaining when eliminated;

(e) determining a tournament winner from the plurality of players based on the tracked tournament game play;

(f) determining a value of the tournament award based, at least in part, on an average expected payout value of each said determined remaining unplayed tournament games; and (g) notifying said at least one tournament winner that said at least one tournament winner wins the tournament award.

6. The method of claim 5, wherein the player elimination triggering event is selected from the group consisting of: a passage of a designated amount of time, a generation of a designated tournament game outcome, a designated number of tournament games played, a designated operator input, a generation of a plurality of designated tournament game outcomes, and a designated amount won by one of the player's during the tournament.

7. The method of claim 5, wherein each of the provided tournament games are a same type of game.

8. The method of claim 5, wherein each of the plays of the tournament games do not require wagers.

9. The method of claim 5, which includes for each of a plurality of the gaming machines, causing said gaming machine to determine a different designated quantity of tournament games available to be subsequently played by the player of said gaming machine in the tournament.

10. The method of claim 5, which includes allocating a percentage of wagers placed on non-tournament games to a pool, and the pool at least in part funding the tournament award.

11. The method of claim 5, which includes allocating a percentage of side wagers placed with wagers on non-tournament games to a pool, and the pool at least in part funding the tournament award.

12. The method of claim 5, which includes determining an advantage from a plurality of different advantages for each of a plurality of the players and providing said determined advantage in said play of the tournament and the average expected payout value of each said determined remaining unplayed tournament game is modified by any advantage of the eliminated player provided said unplayed tournament game.

13. The method of claim 12, wherein for each said player, said advantage is applied to each tournament game played by said player.

14. The method of claim 12, wherein the advantage for each of a plurality of said players is selected from the group consisting of: a modifier, a different designated quantity of provided tournament games to be subsequently played by the player, and a different paytable.

15. The method of claim 12, wherein the advantage provided to each player is determined based, at least in part, on at least one wager made by the player of at least one qualifying non-tournament game.

16. The method of claim 12, wherein the advantage provided to each player is determined based, at least in part, on at least one event associated with a play of a qualifying non-tournament game.

* * * * *

UNITED STATES PATENT AND TRADEMARK OFFICE

CERTIFICATE OF CORRECTION

PATENT NO. : 8,419,546 B2
APPLICATION NO. : 12/871359
DATED : April 16, 2013
INVENTOR(S) : Rogelio S. DeCasa et al.

It is certified that error appears in the above-identified patent and that said Letters Patent is hereby corrected as shown below:

IN THE CLAIMS

Claim 1, Column 39, Line 1, before "the" insert --and--; replace "being" with --are--; delete ","; and after "different" insert --,--.
Claim 3, Column 39, Line 37, delete "play of the".
Claim 3, Column 39, Line 39, delete "remaining".
Claim 5, Column 40, Line 3, replace "the" with --a--.
Claim 5, Column 40, Line 4, after "each" insert --of--.
Claim 6, Column 40, Line 17, replace "player's" with --players--.
Claim 10, Column 40, Line 30, delete "and".
Claim 11, Column 40, Line 34, delete "and".
Claim 12, Column 40, Line 38, after "players" insert --,-- and delete "and".
Claim 12, Column 40, Line 39, delete "play of the"; after "tournament" insert --,--; and between "and" and "the" insert --modifying--.
Claim 12, Column 40, Line 40, delete "remaining".
Claim 12, Column 40, Line 41, delete "is modified".
Claim 15, Column 40, Line 54, replace "of" with --on--.

Signed and Sealed this
Fifth Day of November, 2013

Teresa Stanek Rea
*Deputy Director of the United States Patent and Trademark Office*